US012393262B2

(12) United States Patent
Sanjeev et al.

(10) Patent No.: US 12,393,262 B2
(45) Date of Patent: Aug. 19, 2025

(54) METHODS AND SYSTEMS OF A HANDHELD SPATIALLY AWARE MIXED-REALITY PROJECTION PLATFORM

(71) Applicants: Arvind Sanjeev, Malmo (SE);
Anoushka Garg, Copenhagen (DK);
Can Yanardag, Copenhagen (DK);
Matthew Visco, San Francsico, CA (US)

(72) Inventors: Arvind Sanjeev, Malmo (SE);
Anoushka Garg, Copenhagen (DK);
Can Yanardag, Copenhagen (DK);
Matthew Visco, San Francsico, CA (US)

(*) Notice: Subject to any disclaimer, the term of this patent is extended or adjusted under 35 U.S.C. 154(b) by 1230 days.

(21) Appl. No.: 17/165,939

(22) Filed: Feb. 3, 2021

(65) Prior Publication Data
US 2021/0255328 A1   Aug. 19, 2021

Related U.S. Application Data

(63) Continuation-in-part of application No. 16/984,124, filed on Aug. 3, 2020, now abandoned.
(Continued)

(51) Int. Cl.
*G01S 17/894* (2020.01)
*A63F 13/211* (2014.01)
(Continued)

(52) U.S. Cl.
CPC ............ *G06F 3/011* (2013.01); *G01S 17/894* (2020.01); *G06F 3/017* (2013.01); *G06F 3/167* (2013.01);
(Continued)

(58) Field of Classification Search
CPC ..... G01S 17/894; G06T 19/006; G06T 7/521; G06F 3/017; G06F 3/167; G06F 3/011;
(Continued)

(56) References Cited

FOREIGN PATENT DOCUMENTS

WO    WO-2015192117 A1 * 12/2015 ............. A63F 13/00

OTHER PUBLICATIONS

Sanders et al. ("US Wii Price, Launch Date Revealed," 2006, 2012, downloaded 2025, 8 psgrd. (Year: 2025).*

* cited by examiner

*Primary Examiner* — Daniel L Murphy

(57) ABSTRACT

In one aspect, a method for augmenting a physical environment with projected media content from a virtual environment, using a handheld spatially aware mixed reality projection platform, includes the step of providing a handheld spatially aware mixed-reality projection device. The method includes the step of using a mapping application in the handheld spatially aware mixed-reality projection device. The method includes the step of relocalizing the handheld spatially aware mixed-reality projection device based on a virtual three-dimensional map of a physical environment. The relocalizing generates pose information of the handheld spatially aware mixed-reality projection device in the physical environment with respect to the virtual three-dimensional map. The method includes the step of sharing the set of three-dimensional pose information with a game engine application of the handheld spatially aware mixed-reality projection device.

19 Claims, 19 Drawing Sheets

Related U.S. Application Data

(60) Provisional application No. 62/882,167, filed on Aug. 2, 2019.

(51) Int. Cl.
| | |
|---|---|
| *A63F 13/213* | (2014.01) |
| *G06F 3/01* | (2006.01) |
| *G06F 3/16* | (2006.01) |
| *G06T 7/521* | (2017.01) |
| *G06T 19/00* | (2011.01) |
| *G06V 10/10* | (2022.01) |
| *G06V 20/64* | (2022.01) |
| *A63F 13/216* | (2014.01) |
| *A63F 13/219* | (2014.01) |
| *A63F 13/327* | (2014.01) |

(52) U.S. Cl.
CPC ............ *G06T 7/521* (2017.01); *G06T 19/006* (2013.01); *G06V 10/17* (2022.01); *G06V 20/647* (2022.01)

(58) Field of Classification Search
CPC ........ G06K 9/22; G06V 10/17; G06V 20/647; A63F 13/211; A63F 13/213; A63F 13/216; A63F 13/217; A63F 13/219; A63F 13/28; A63F 13/327; A63F 13/355
USPC ....................................................... 356/5.01
See application file for complete search history.

METHODS AND SYSTEMS OF A HANDHELD SPATIALLY AWARE MIXED-REALITY PROJECTION PLATFORM

CLAIM OF PRIORITY

This application claims priority to U.S. patent application Ser. No. 16/984,124 filed on 3 Aug. 2020 and titled METHODS AND SYSTEMS OF A SPATIALLY AWARE MIXED-REALITY PROJECTION DEVICE.

U.S. patent application Ser. No. 16/984,124 claims priority from U.S. Provisional Patent Application No. 62/882,167 filed on 2 Aug. 2019 and titled METHODS AND SYSTEMS OF A MIXED-REALITY PLATFORM. This provisional application is hereby incorporated by reference in its entirety.

BACKGROUND

The IT industry is burgeoning with augmented reality (AR) and virtual reality (VR)-based technologies. Examples include, inter alia: the Microsoft Holo lens, Oculus Quest, HTC Vive, and the like. However, users may have to wear headsets to experience AR and VR. These AR/VR headsets can socially isolate users as they are not able to share the experiences with others around them. Accordingly, improvements are desired to bring out the AR/VR experiences confined within headsets or smartphones out into the real world by using projected augmented reality thereby encouraging people to freely walk around different environments without being tethered to a single location. The improvements can use this handheld device to map the physical environment and generate a virtual map of a given space-a museum or a classroom for instance. It then uses this map to overlay virtual experiences on top of the physical space through projection.

SUMMARY OF THE INVENTION

In one aspect, a method for augmenting a physical environment with projected media content from a virtual environment, using a handheld spatially aware mixed reality projection platform, includes the step of providing a handheld spatially aware mixed-reality projection device. The method includes the step of with a using a mapping application in the handheld spatially aware mixed-reality projection device. The method includes the step of relocalizing the handheld spatially aware mixed-reality projection device based on a virtual three-dimensional map of a physical environment. The relocalizing generates pose information of the handheld spatially aware mixed-reality projection device in the physical environment with respect to the virtual three-dimensional map. The method includes the step of sharing the set of three-dimensional pose information with a game engine application of the handheld spatially aware mixed-reality projection device. The method includes the step of, with the game engine application, placing the handheld spatially aware mixed-reality projection device in a set of equivalent virtual world coordinates and corresponding orientation in the virtual three-dimensional map of the space. The virtual three-dimensional map of the space is augmented with digital media content to create a virtual environment. The method includes the step of detecting that the handheld spatially aware mixed-reality projection device is pointing at a physical structure that corresponds to an image target. The method includes the step of using the laser projector in the handheld spatially aware mixed-reality projection device, the device creates a projection field. The spatially mapped digital media content is revealed from the virtual environment overlaid onto the physical environment.

Figure 1:
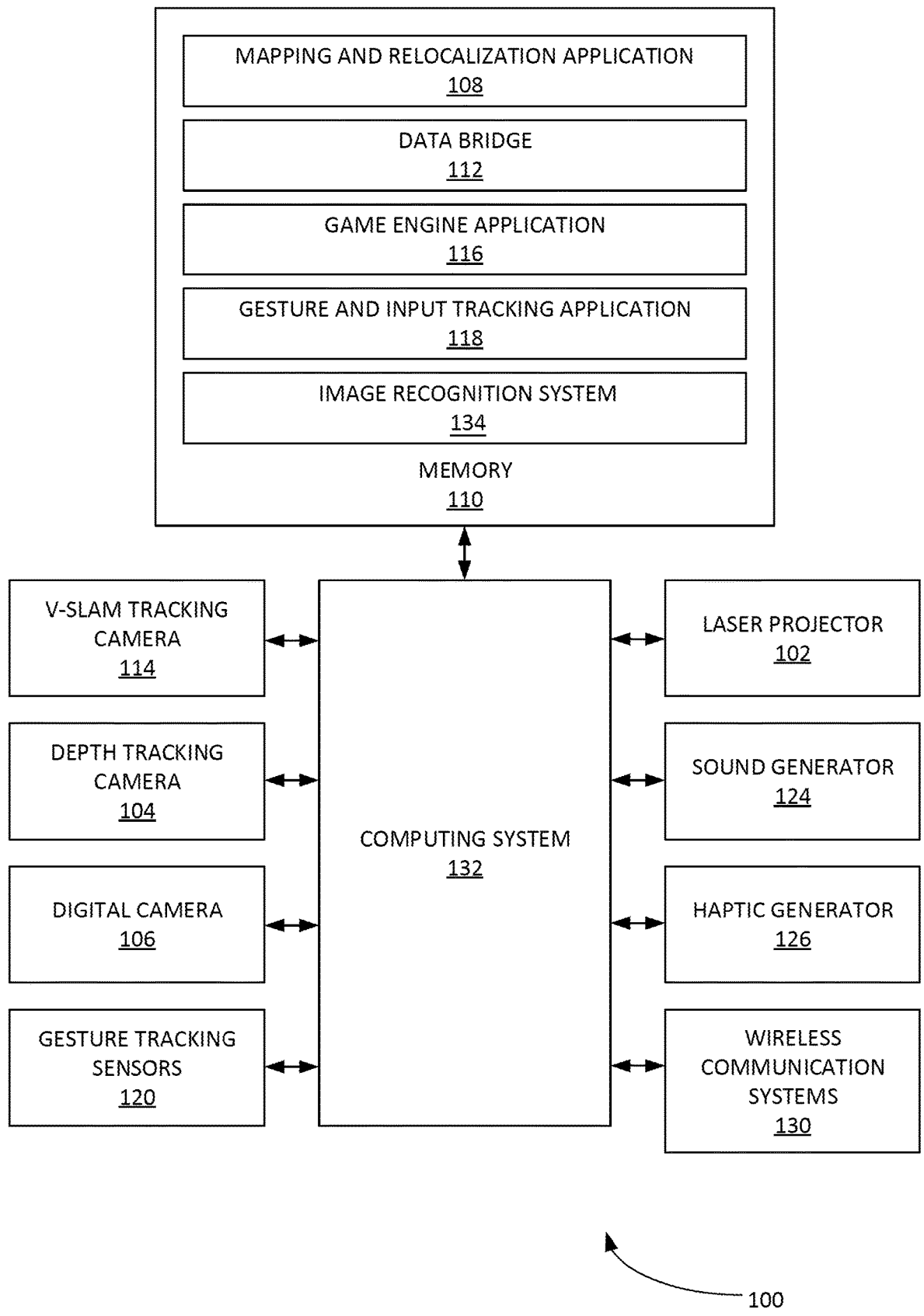
FIG. 1 illustrates an example mixed-reality system used for implementing a handheld spatially aware mixed-reality projection platform, according to some embodiments.

The Figures described above are a representative set and are not exhaustive with respect to embodying the invention.

DESCRIPTION

Disclosed are a system, method, and article of a handheld spatially aware mixed-reality projection platform. This handheld spatially aware mixed-reality projection platform is spatially aware in the physical environment and can project or activate respective digital media content depending on the location, orientation, and projection direction of the handheld device in physical space. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Device pose information includes 3D position coordinates and orientation information.

Digital media content can be digital images, video, interactive media, text, graphical user interfaces, 3D graphics, 2D animation, 3D animation, etc.

Gesture recognition can interpret human gestures via mathematical algorithms. Gestures can originate from any bodily motion or state (e.g., originate from the face, hand, fingers, body, etc.).

Haptic technology can include various forms of kinesthetic communication, 3D touch, etc. Haptics can include any technology that creates an experience of touch by applying forces, vibrations, or motions to the user.

Image targets can include objects, spaces, physical structures, textured surfaces, etc., in the physical environment that can be recognized using image recognition or computer vision.

LIDAR is a method for measuring distances by illuminating the target with laser light and measuring the reflection with a sensor. Differences in laser return times and wavelengths can then be used to make digital 3-D representations of the target.

Mixed Reality (MR) is the blending of the physical and digital worlds. MR can include, inter alia: real environment, augmented reality, augmented virtuality, virtual reality, etc.

Physical environments can be both indoor and outdoor spaces such as 2D walls, floors, streets, but also 3D objects, sculptures, etc.

Platform can be a handheld device, stand alone device, worn device, device interacting with local or cloud server, smartphone case with a projector, etc. and/or any combination thereof.

Point cloud is a set of data points in space. Point clouds are generally produced by 3D scanners, which measure a large number of points on the external surfaces of objects around them.

Projection field is the area of space that falls within the borders of a projection.

Simultaneous localization and mapping (SLAM) is the computational method of constructing or updating a map of an unknown environment while simultaneously keeping track of an agent's location within it.

Wireless LAN (WLAN) is a wireless computer network that links two or more devices using wireless communication to form a local area network (LAN) within a limited area.

Virtual environment can be a virtual three-dimensional map of a physical environment stored in a game engine application and augmented with digital media content.

EXAMPLE SYSTEMS

FIG. 1 illustrates an example handheld spatially aware mixed-reality projection platform 100 used for implementing a handheld spatially aware mixed-reality projection platform, according to some embodiments. Handheld spatially aware mixed-reality projection platform 100 can be a handheld device. Handheld spatially aware mixed-reality projection platform 100 can be a spatially aware mixed-reality projection device. Handheld spatially aware mixed-reality projection platform 100 can obtain digital information about its physical environment and/or project and activate digital media content (e.g., digital images/videos, interactive applications, etc.). Handheld spatially aware mixed-reality projection platform 100 can be spatially aware in its physical environment. Handheld spatially aware mixed-reality projection platform 100 can be integrated into a mixed-reality storytelling platform that lets people immerse in alternate realities in their natural space through projection mapping technologies. Handheld spatially aware mixed-reality projection platform 100 can provide media that utilizes objects/locations of the physical world while overlaying a layer of digital media content (e.g., videos, images, interactive content, sounds, haptics, digital fiction, etc.) on top of it.

Handheld spatially aware mixed-reality projection platform 100 can include one or more laser projector(s) 102. Laser projector 102 can be a device that projects laser beams on a specified object to create a moving image for entertainment or professional use. Laser projector 102 can include, inter alia: lasers, mirrors, galvanometer scanners, and other optical components. Laser projector 102 can include a laser light source for single-color projection or three sources for RGB (red, green, and blue) full color projection.

Depth tracking camera 104 can obtain depth information (e.g. with respect to the distance to depth tracking camera 104). Various types of rangefinders can be utilized (e.g., Stereo triangulation, LIDAR, sheet of light triangulation, structured light, time-of-flight, interferometry, coded aperture, etc.). In some examples, a mobile depth camera can be used. Depth tracking camera 104 can be and/or use a VSLAM tracking camera (e.g., VSLAM camera 114 infra, etc.). Image recognition system 134 can include systems for visual inertial odometry simultaneous localization and mapping (SLAM). It is noted that image recognition can include target recognition, image recognition, object recognition, etc. It is noted that, in one example embodiment, depth camera 104 and a VSLAM camera can be combined to make handheld spatially aware mixed-reality projection platform 100 spatially aware. Handheld spatially aware mixed-reality projection platform 100 can use depth camera 104 and a VSLAM camera to scan and generate maps of spaces.

Depth camera 104 and VSLAM camera can be used to create spatial awareness by scanning and generating maps of physical spaces/environments. Spatial awareness can be created by mapping the surfaces of immovable permanent structures (e.g., walls, floors, ceilings) as well as mapping the surfaces of movable structures (e.g., objects that are placed on floors, walls, ceilings) and then relocalizing the handheld device in the map using physical coordinates and orientation of device. In case any of the mapped objects have shifted their position or if new objects or people are in the space, the platform is able to compare the new spatial topography of the map with the old spatial topography of the map and recognize the shifted object/objects. The platform can thus retain spatial awareness even if the movable structures or objects have moved to different positions from the original positions that they were first scanned in. It is noted that, in some embodiments, a LIDAR camera and/or similar systems can be included in the system (e.g., in addition to or replacement of either the depth camera 104 and/or VSLAM camera, etc.).

Digital camera 106 can obtain digital images/video of the physical environment of handheld spatially aware mixed-reality projection platform 100. In some embodiments, handheld spatially aware mixed-reality projection platform 100 can include a plurality of digital cameras.

Computing systems 132 can include various processors, computer memory, etc. In some examples, computing systems 132 can include small single-board computers (e.g., sufficiently powerful processors such as, for example, an INTEL® Core i7 processor(s), etc.).

Image recognition system 134 can identify the content of digital images obtained from digital camera 106. Image recognition system 134 can include various computer vision, image processing, image/object/space target recognition, and machine vision functionalities. One or several pre-specified or learned objects or object classes can be recognized, usually together with their 2D positions in the image or 3D poses in the scene in the view of handheld spatially aware mixed-reality projection platform 100. Individual instances of objects in the view of handheld spatially aware mixed-reality projection platform 100 can be recognized. For example, image recognition system 134 can identify a specific person's face or other attributes (e.g., heights, fingerprint, clothing, etc.), handwritten/printed digits, or vehicles, animals, buildings, etc. Digital images can be scanned for a specific condition (e.g., medical conditions, facial emotion, dangers, etc.). Image recognition system 134 can upload examples/templates for recognition from an enterprise (e.g., museum items, educational material, zoo animals, game participant identities, etc.). Image recognition system 134 can offload some of the processing to remote servers that utilize various machine learning techniques (e.g., convolution neural networks, etc.). Image recognition system 134 can perform content-based image retrieval to identify/locate images in a larger set of images which have a specific content. Image recognition system 134 can scan matrix codes, etc.

Recognized image content can be communicated to remote server systems for analysis, incorporation into a current story/educational material, etc. Recognized content can be used to determine the content of projected digital media. However, it is noted that in some embodiments, computation onboard through the computing system (e.g., computer unit 132 discussed infra).

Gesture tracking sensors 120 can be included in handheld spatially aware mixed-reality projection platform 100. Gesture tracking sensors 120 can obtain various hand tracking and gesture recognition inputs. These inputs can then be translated into specified handheld spatially aware mixed-reality projection platform 100 operations. Gesture tracking sensors 120 can provide a touchless user interface. The touchless user interface can be used to command handheld spatially aware mixed-reality projection platform 100 via specified body motion and gestures. Gesture tracking sensors 120 can include, inter alia: depth-aware cameras, stereo cameras, gesture-based controllers, etc. In some examples, data from gesture tracking sensors can be used by a 3D model and/or an appearance to implement gesture recognition.

Recognized image content can be communicated to remote server systems for analysis, incorporation into a current story/educational material, etc. Recognized content can be used to determine the content of projected digital media. However, it is noted that in some embodiments, computation onboard through the computing system (e.g. computer unit 132 discussed infra).

Additional physical and/or logical systems can be included in handheld spatially aware mixed-reality projection platform 100, such as, inter alia: additional sensors, microphones, speakers (e.g., sound generator 124, local speakers, directional speakers, etc.), gyroscopes, accelerometers, GPS systems, other location detection systems, calculators, additional computer storage, web browsers, Wi-Fi systems, flashlight systems, etc.

Handheld spatially aware mixed-reality projection platform 100 can be used for various use cases as provided herein. For example, handheld spatially aware mixed-reality projection platform 100 can include and/or be coupled with various systems such as: inter alia: digital logic, applications, and functionalities for playing games and telling mixed-reality stories. Narratives for the handheld spatially aware mixed-reality projection platform 100 can be designed by storytellers and game designers. These designers can have access to the background graphical interface that can serve as the story builder and dashboard.

Handheld spatially aware mixed-reality projection platform 100 can be communicatively coupled (e.g., with a Bluetooth® connect, USB connection, etc.) with, inter alia: a mobile device via wireless communication systems 130. Wireless communication systems 130 can be communicatively coupled with a wireless LAN (WLAN) that is itself coupled with a wider computer network such as the Internet.

The handheld spatially aware mixed-reality projection platform 100 can include an application (e.g., game engine application 116, a custom dashboard application, etc.) for managing the projected digital media content. For example, the identity of objects to project specified images onto and the actions of said images can be uploaded to a mobile device application. This information can be provided in specified modules. For example, a museum can provide a module of object/projection content pairs. In another example, another mobile device application (e.g., game engine application 116) can provide object/projection content pairs so that a control system (e.g., a projection of a dashboard, etc.) for the mobile device application can be projected onto a specified object. Various education modules can be uploaded to the mobile device application. In some examples, the modules can be uploaded directly to the handheld spatially aware mixed-reality projection platform 100.

Handheld spatially aware mixed-reality projection platform 100 can include a power source 128. Power source 128 can be a battery system, a solar-power system, etc. Handheld spatially aware mixed-reality projection platform 100 can include haptic generator 126. Haptic generator 126 can provide haptic output to a user. Haptic output signals can have an interpretable meaning for the user.

Handheld spatially aware mixed-reality projection platform 100 can include system memory 110. System memory 110 can include various modules/software stacks for implementing mixed reality-based operations utilizing the systems already described. System memory 110 can include mapping and relocalization application 108. Mapping and relocalization application 108 can create a local map. This can be a spatial map of a space (e.g., a room) or other location. Mapping and relocalization application 108 then positions the handheld device within the map at the corresponding pose using orientation and position information. Examples of mapping and relocalization are provided infra. Mapping and relocalization application 108 can use data from VSLAM tracking camera 114 and/or depth camera 104. The data from the VSLAM tracking camera 114 can then be used to build a map of an environment and then leveraging the map locate the handheld spatially aware mixed-reality projection device 100 in the map. This can be based on inside out and/or outside in tracking (e.g., using SLAM-computer vision techniques, photogrammetry, live base stations, etc.).

System memory 110 can include data bridge 112. Data bridge 112 can function as a bridge for data between modules 108, 116, 118, etc. and/or the other systems of FIG. 1.

System memory 110 can include game engine application 116. Game engine application 116 can determine digital media content (e.g., digital images, videos, audio, interactive applications, etc.) to be projected by the laser projector 102. Game engine application 116 can contain the virtual environment to be projected and spatially mapped onto the physical environment. Game engine application 116 can receive pose information to determine equivalent coordinates and orientation of the handheld spatially aware mixed-reality projection platform in the virtual environment. It is noted that the game engine application can be an off the shelf application (e.g., UNITY®, etc.) or it can also be/include a custom-built software.

System memory 110 can include gesture and input tracking application 118. Gesture and input tracking application 118 can implement gesture tracking and user input detection. In some examples, data from gesture tracking sensors 120 can be used to implement gesture recognition.

Handheld spatially aware mixed-reality projection platform 100 can be used to provide control mechanisms for various real-world and/or augmented-reality systems. Users can interact with these control mechanisms via a user input interface. The user input interface can include various physical and/or virtual user input devices (e.g., virtual buttons, virtual sliders, etc.).

Handheld spatially aware mixed-reality projection platform 100 can project and activate various control and/or system state objects onto a surface. The surface can be the surface of a device and the control objects can be related to control of the physical or digital/virtual aspects of the handheld spatially aware mixed-reality projection platform. For example, handheld spatially aware mixed-reality projection platform 100 can link a physical speaker system with an audio streaming platform. Various mixed-reality objects can be projected on the surface of the physical speaker system that control the options and behavior of the audio streaming platform. User interaction with the mixed-reality objects (e.g., a mixed reality object that selects a song in the audio streaming platform) can be sensed, recognized, and communicated to the audio streaming platform. The audio streaming platform can respond accordingly (e.g., playing a new song, turning off, turning on, etc.). This can extend to all kinds of IoT devices and appliances (smart lights, TVs, etc.).

Figure 2:
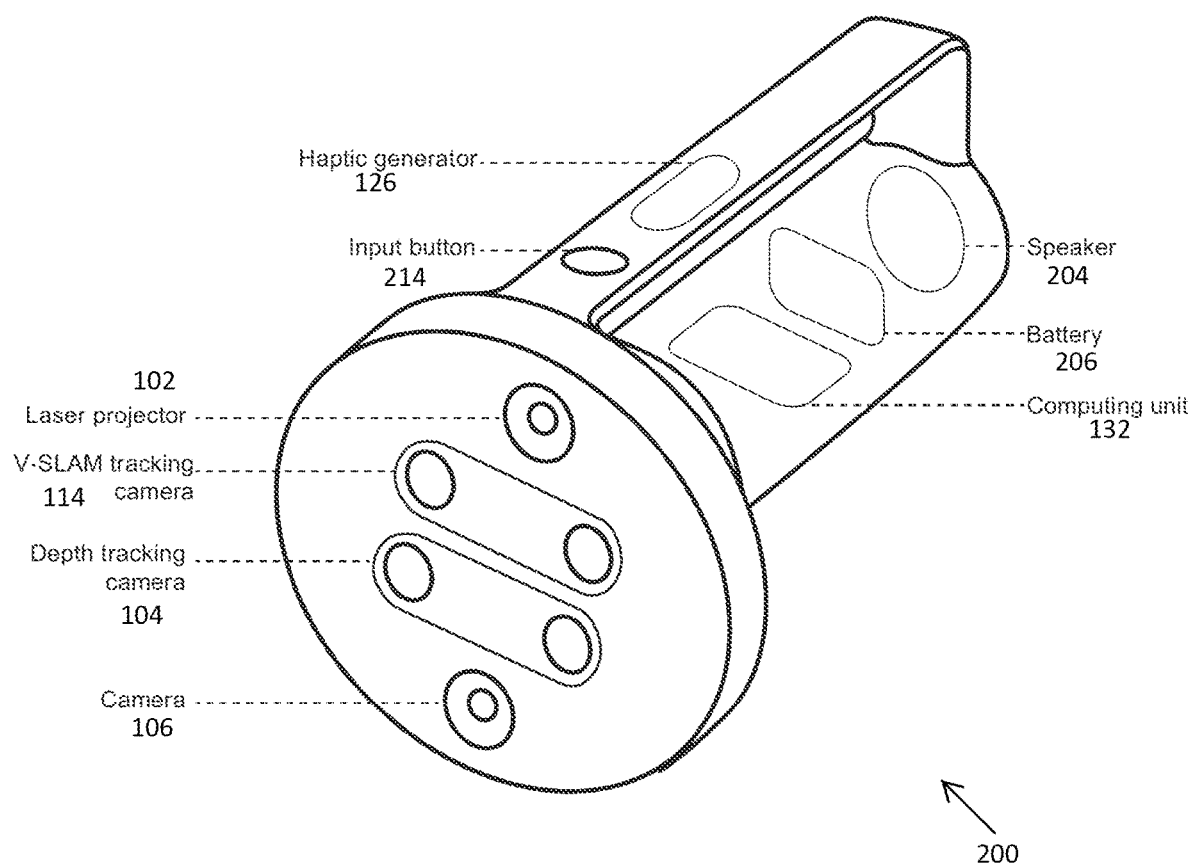
FIG. 2 illustrates additional example views of a flashlight-type of handheld spatially aware mixed-reality projection platform, according to some embodiments.

FIG. 2 illustrate additional example views of a flashlight-type of handheld spatially aware mixed-reality projection platform 200, according to some embodiments. As shown, flashlight-type of handheld spatially aware mixed-reality projection platform 200 can be sized and weighted such that a user can hold it comfortably in one hand while in operation. Flashlight-type of handheld spatially aware mixed-reality projection platform 200 can include a substantially flat and circular face. The face can include various projection and sensing systems as shown. For example, the face can include, inter alia: laser projector 102, VSLAM (visual SLAM) tracking camera 114, depth tracking camera 104, digital camera 106, etc.

VSLAM tracking camera 114 and/or with depth cam 104 can use visual sensors to implement SLAM to generate a topological map of a local environment. VSLAM tracking camera 114 can obtain data that enables calculating the position and orientation of a handheld spatially aware mixed-reality projection device with respect to its surroundings while mapping the environment at the same time (e.g., using visual inputs). VSLAM tracking camera 114 and/or depth cam 104 can use computer vision for indoor location and positioning. This can be an environmental representation which captures the topology of the environment (e.g., a room, a museum exhibit, a workshop, etc.). It is noted that in other examples, other arrangements of cameras, projectors and sensors can be provided.

Flashlight-type of handheld spatially aware mixed-reality projection platform 200 can include a handle portion. The handle portion can include user interface tools. For example, the handle portion can include haptic generator 126, input button 214, etc. The body of flashlight-type of handheld spatially aware mixed-reality projection platform 200 can include various computing systems, networking systems, power sources, additional user interface tools, etc. For example, as shown, the body can include: speaker 204, battery 206 and computing unit 208.

It is noted that other mixed-reality systems can be in other forms. For example, mixed-reality systems can be integrated into toys/games to augment the play experience. Spatially aware mixed-reality systems can be integrated into training tools (e.g., mechanics tools, medical devices, construction tools, etc.) to augment/enhance the work/training experience. Mixed-reality systems can be integrated into cooking systems. Spatially aware mixed-reality systems can be integrated into security systems. Spatially aware mixed-reality systems can be integrated into animal control/training systems. Spatially aware mixed-reality systems can be integrated into educational systems. Spatially aware mixed-reality systems can be integrated into rehabilitation and/or exercise systems. Spatially aware mixed-reality systems can include a plurality of handheld spatially aware mixed-reality projection platforms.

Example Processes

Figure 3:
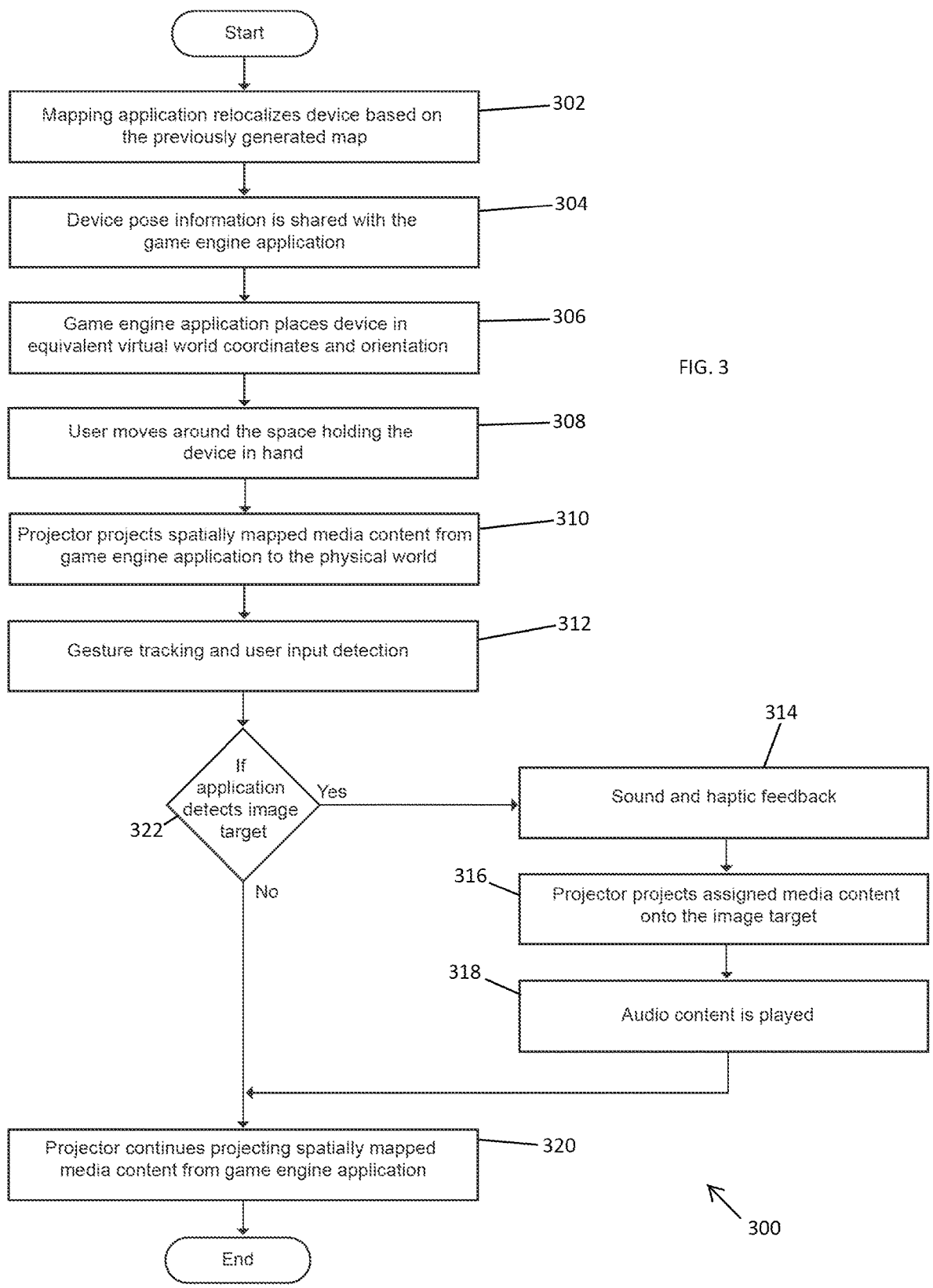
FIG. 3 illustrates an example process for spatial content mapping and projection with a handheld spatially aware mixed-reality projection platform, according to some embodiments.

FIG. 3 illustrates an example process for spatial content mapping and projection with a handheld spatially aware mixed-reality projection platform, according to some embodiments. In step 302, a mapping application relocalizes the device based on the previously generated map. In step 304, the device pose information is shared with the game engine application. In step 306, the game engine application places the device in equivalent virtual world coordinates and orientation. In step 308, the user moves around the space holding the device in hand. In step 310, the projector projects spatially mapped media content from game engine application to the physical world. This media content in the virtual world is spatially mapped to the physical space and is revealed by projection only when the flashlight type of handheld device is in the corresponding position and orientation in the physical space while pointing towards the respective physical surface/structure/object. The device can scale the size of the projected content seamlessly to make it behave like real world content (e.g., a painting projected on the wall) while locking it in place spatially.

In step 312, process 300 implements gesture tracking and user input detection. In step 322, process 300 determines if application detects image target.

In step 314, process 300 implements sound and haptic feedback. In step 316, the projector projects assigned media content onto the image target. An image target can be used to increase the accuracy of projection location. Image targeting can be used to avoid drift of the projection of media content from a specified location (e.g., a picture frame, a face of a sculpture, etc.). Image targets represent images/objects/spaces that image recognition system 134 can detect and track. Image recognition system 134 detects and tracks the image by comparing extracted natural features from the camera image against a known target resource database. Once the image target is detected, image recognition system 134 can track the image and augment the media content in a seamless manner.

In step 318, audio content is played. In step 320, the projector continues projecting spatially mapped media content from the game engine application.

Figure 4:
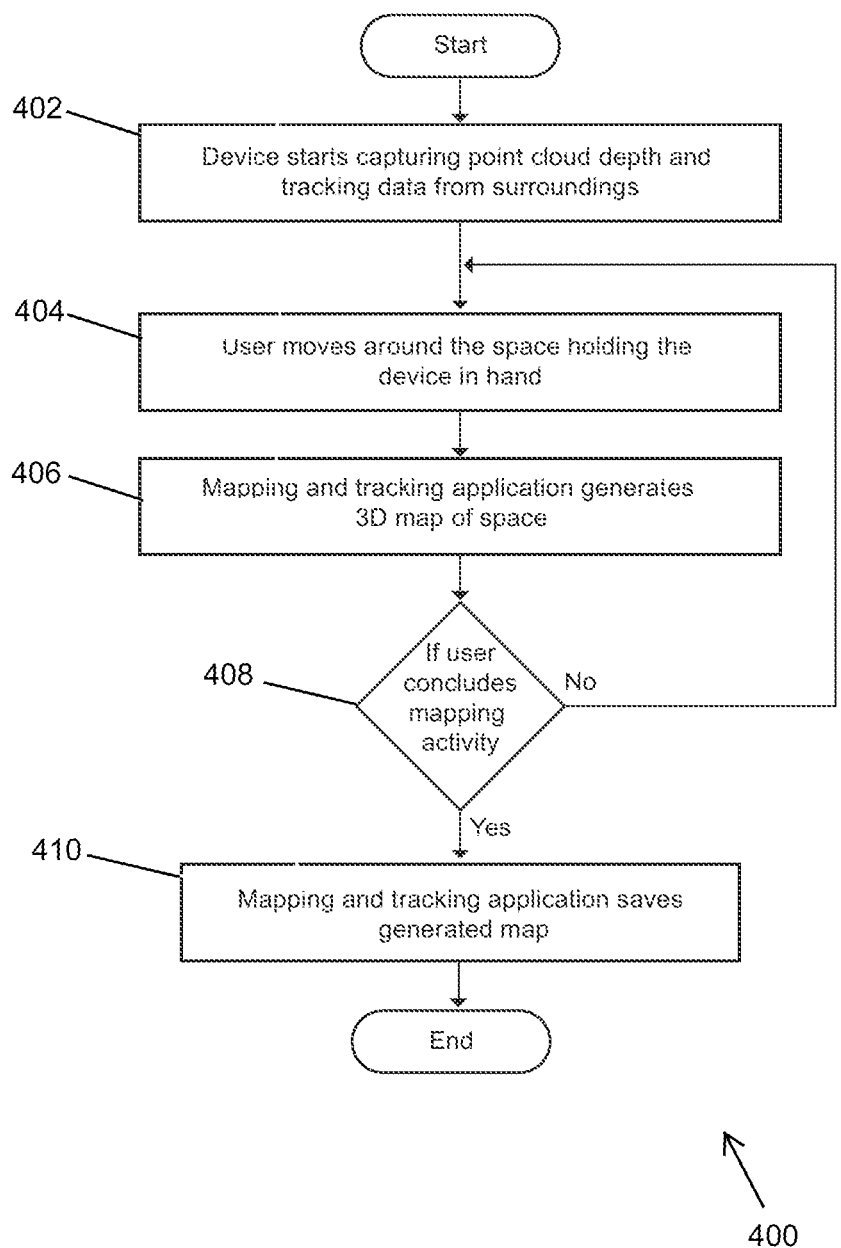
FIG. 4 illustrates an example process for generating the first map in an environment, according to some embodiments.

FIG. 4 illustrates an example process 400 for generating the first map in an environment, according to some embodiments. In step 402, the handheld spatially aware mixed-reality projection platform starts capturing point cloud depth and tracking data from surroundings. In step 404, a user moves around the space holding the handheld spatially aware mixed-reality projection device in hand. For example, the user can scan and map a physical environment using a VSLAM system (or similar scanning and mapping system).

In step 406, the mapping and tracking application generates a 3D map of the physical environment. In step 408, process 400 determines if the user concludes mapping activity. If 'yes', then process 400 proceeds to step 410. If 'no', then process 400 returns to step 404. In step 410, the mapping and tracking application saves the generated map.

Figure 5:
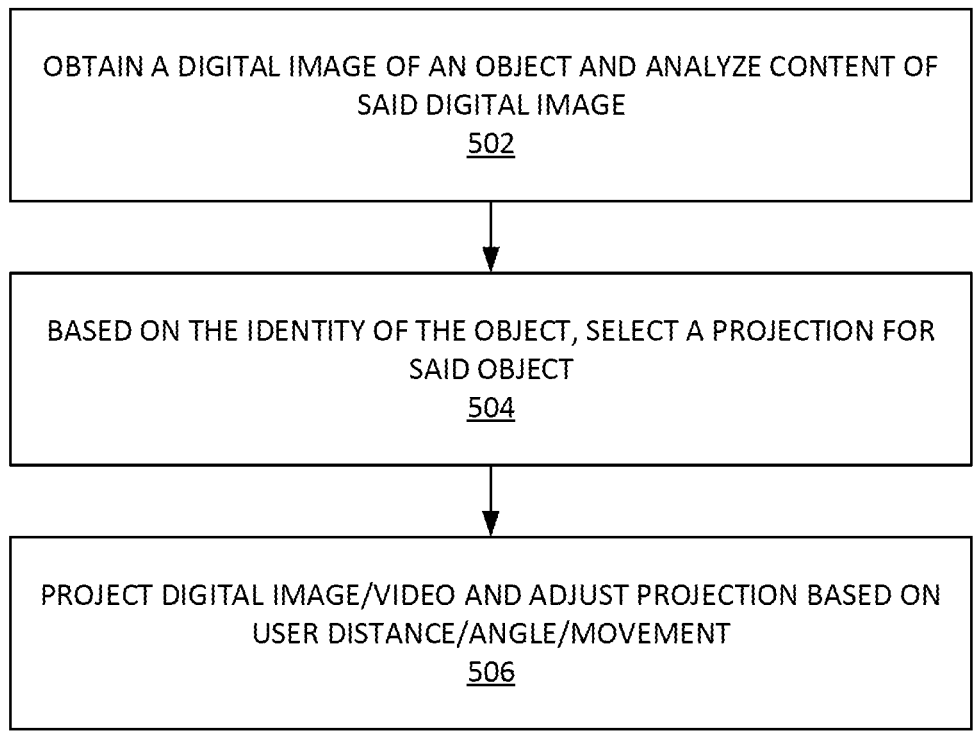
FIG. 5 illustrates an example process for operating the projection of an image onto a surface/object, according to some embodiments.

FIG. 5 illustrates an example process 500 for operating the projection of an image onto a surface/object, according to some embodiments. In step 502, process 500 can obtain a digital image of an object and analyze content of said digital image. The digital image can be obtained by a digital camera system in the handheld spatially aware mixed-reality projection platform. In step 504, based on the identity of the object, process 500 can select a projection for said object. The handheld spatially aware mixed-reality projection platform can include image recognition and machine vision functionalities. The handheld spatially aware mixed-reality projection platform can also offload image recognition and machine vision functionalities to a cloud-based image recognition and machine vision functionality. In step 506, process 500 can project digital image/video and adjust projection based on user distance/angle/movement. The handheld spatially aware mixed-reality projection platform can include various gyroscopes, accelerometers, depth sensors (e.g., depth tracking camera 104, etc.), distance sensors, etc. With the data from these sensors, the handheld spatially aware mixed-reality projection platform can adjust the size and other effects of the projected digital images/videos based on the user's pose, handheld spatially aware mixed-reality projection platform poses, etc., such that a consistent digital image/video is shown on the object/surface.

Figure 6:
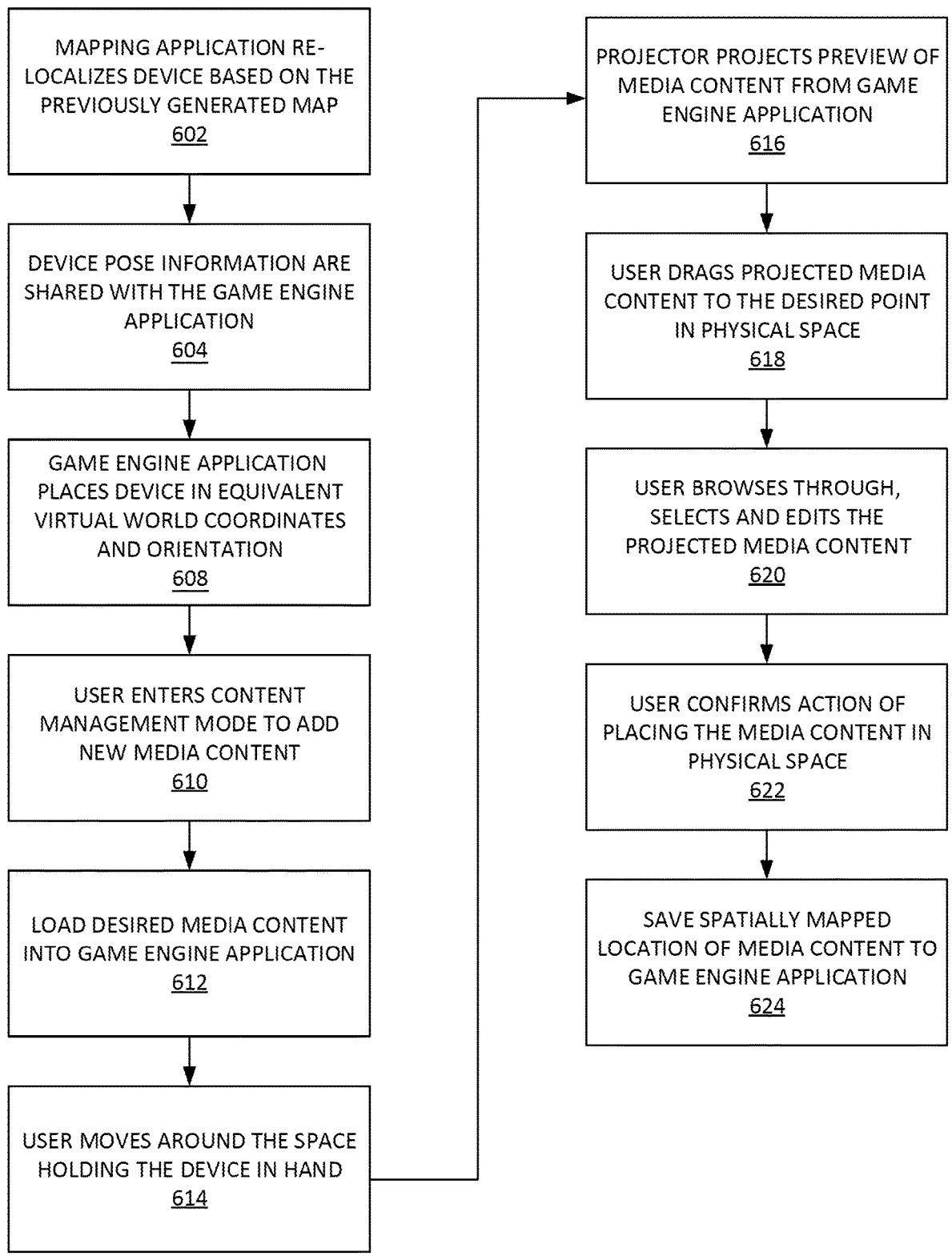
FIG. 6 illustrates an example process for assigning media content onto the spatially mapped physical space, according to some embodiments.

FIG. 6 illustrates an example process for assigning media content onto the spatially mapped physical space, according to some embodiments. Process 600 can be utilized to assign media content onto an image target to be used by process 300.

In step 602, process 600 can implement relocalization of the device based on the previously generated map. In step 604, device pose information including coordinates and orientation are shared with the game engine application. In step 608, the game engine application places the device in equivalent virtual world coordinates and corresponding orientation. In step 610, the user enters the content management mode to add new media content. In step 612, process 600 loads the desired media content into the game engine application. In step 614, the user moves around the space holding the handheld spatially aware mixed-reality projection device in hand. In step 616, the projector projects preview of media content from the game engine application. In step 618, the user drags and/or places the projected media content to the desired point in physical space. In step 620, the user browses through, selects and edits the projected media content. In step 622, the user confirms action of placing the media content in physical space. In step 624, process 600 can save the spatially mapped location of media content to the game engine application.

In one example, process 600 can be used for the management and placement of virtual media content via projection onto physical space. Handheld spatially aware mixed-reality projection platform can be placed in a content management mode. In this mode, the user is able to preview, browse through, edit, place, and move projected virtual media content in an already mapped physical space. While in content management mode, when the user projects onto a physical space that has virtual media content already placed there, they can see this content in the projection, select it and edit (e.g., transform, delete, etc.) it. Instead of editing existing content, if the user wishes to add new content, then the user can select the 'add content' function. A spatial content placing and mapping process can then be implemented. In some examples, a user can also switch between the content management mode and an experience mode (e.g.

where the user experiences the digital media content in action) of the handheld spatially aware mixed-reality projection platform.

Figure 7:
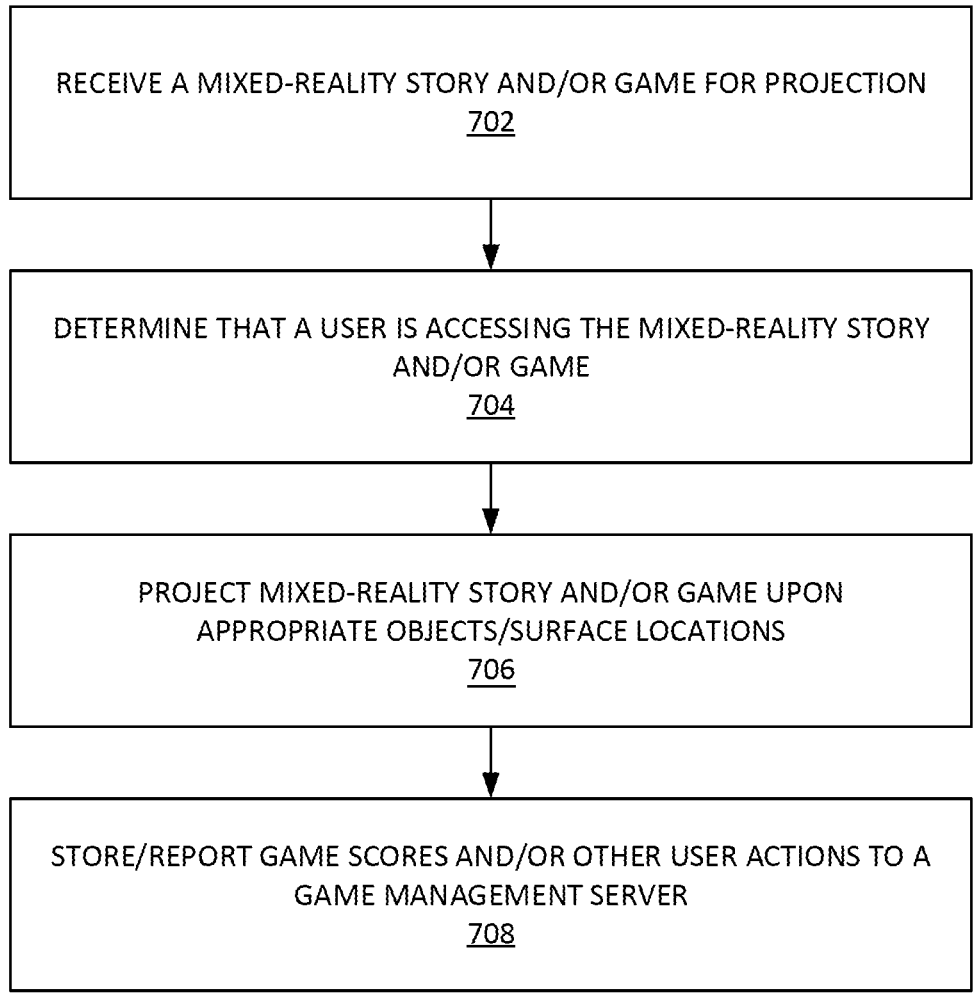
FIG. 7 illustrates an example process for using a mixed-reality system for a storytelling and/or game purpose, according to some embodiments.

FIG. 7 illustrates an example process 700 for using a mixed-reality system for a storytelling and/or game purpose, according to some embodiments. In step 702, process 700 can receive a mixed-reality story and/or game for projection. In step 704, process 700 can determine that a user is accessing the mixed-reality story and/or game. In step 706, process 700 can implement a projection mixed-reality story and/or game upon appropriate objects/surface locations. In step 708, process 700 can store/report game scores and/or other user actions to a game management server.

EXAMPLE USE CASES

Figure 8:
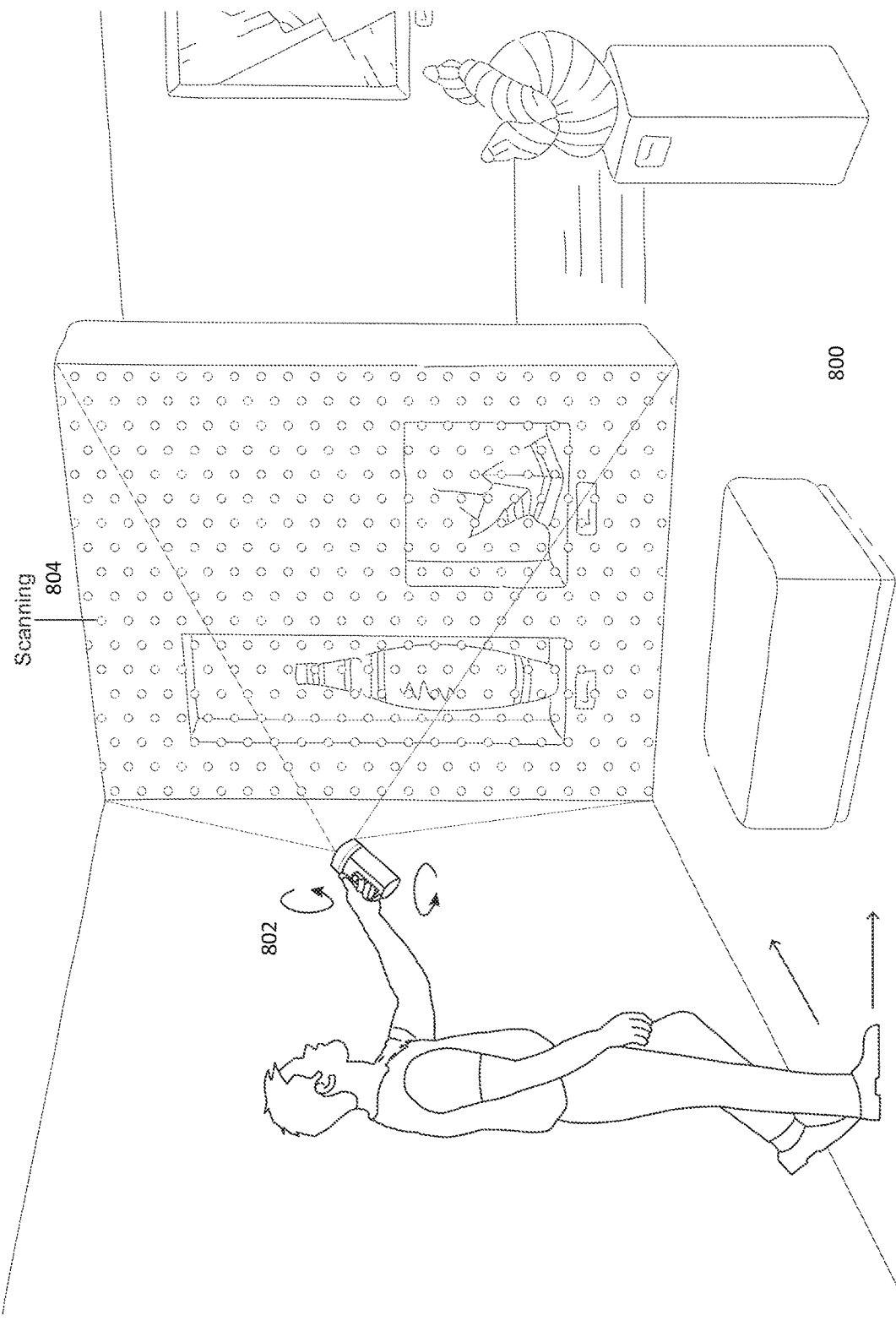
FIGS. 8 and 9 illustrate example depictions of a map generation of a physical environment, according to some embodiments.
Figure 9:
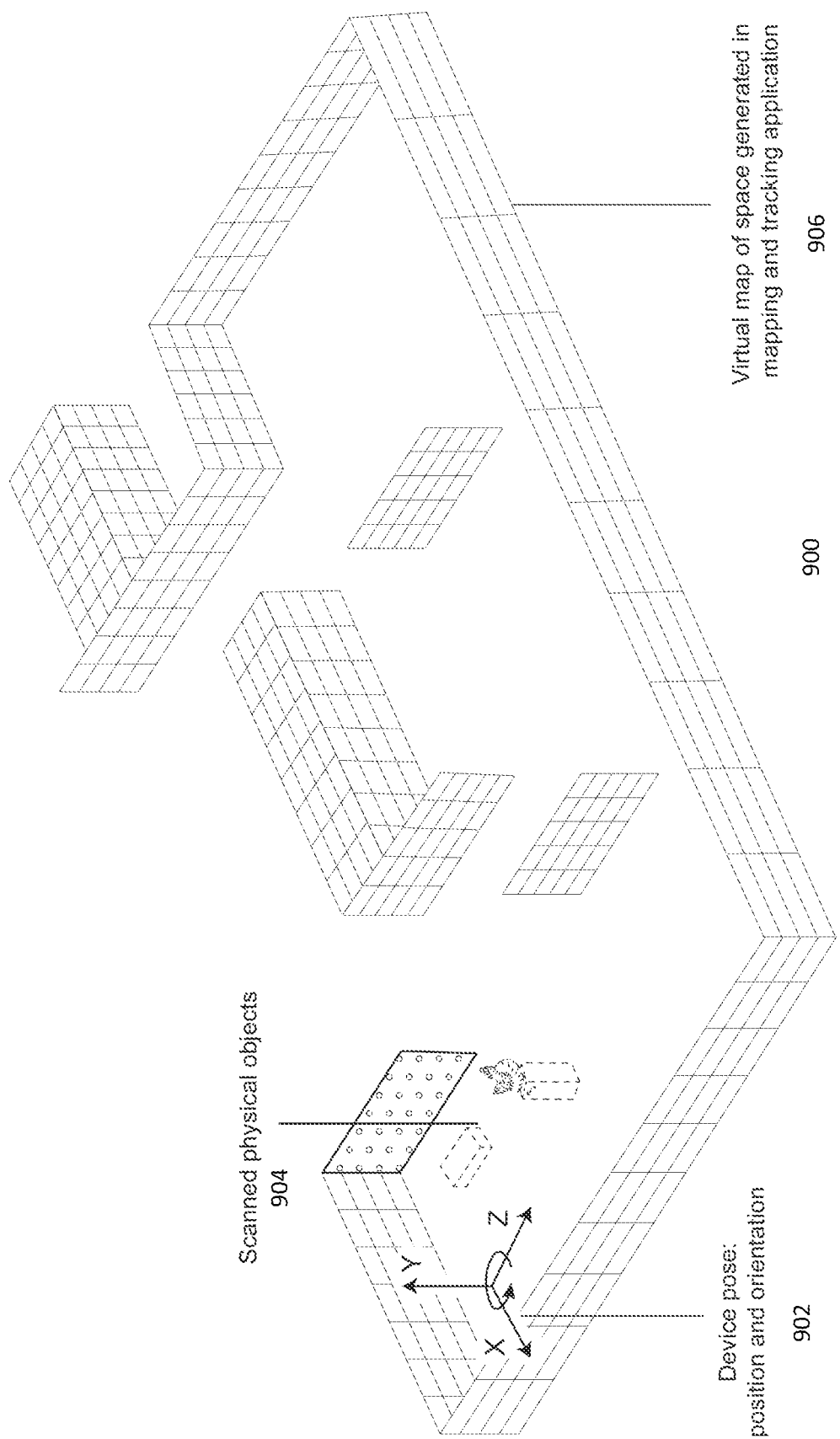

FIGS. 8 and 9 illustrate example 800 and 900 depictions of a map generation of a physical environment, according to some embodiments. Depiction 800 corresponds to a physical world view of spatial scanning used for a map generation event. Depiction 900 corresponds to a virtual view of the map generation event.

In depiction 800, the user is standing and/or moving around in the physical environment scanning the walls and objects of the physical space with a flashlight-type of handheld spatially aware mixed-reality projection platform. The flashlight-type of handheld spatially aware mixed-reality projection platform can include a SLAM system (e.g., a VSLAM system) that obtains data for including the walls and objects in a 3D map of the space. The spatial scanning of wall 804 is schematically shown with dots.

Depiction 900 symbolizes the user position and orientation 902 as a 3D axis in a map 906 of a series of rooms of the space. Map 906 is a virtual map of space generated in a mapping and tracking application in the flashlight-type of handheld spatially aware mixed-reality projection platform. Map 906 also includes scanned objects 904 in the series of rooms that have been spatially scanned. Map 906 shows wall 804 being spatially scanned with the user in the same position and orientation as provided in depiction 800. Map 906 can be used by a game engine to place and locate various digital media content to later be projected by a flashlight-type of handheld spatially aware mixed-reality projection platform. This can be the same flashlight-type of handheld spatially aware mixed-reality projection platform that was used to generate map 906 or other flashlight-type of handheld spatially aware mixed-reality projection platforms that have downloaded map 906. Accordingly, map 906 can also be uploaded to a server-side system and/or remote database as well so that other flashlight-type of handheld spatially aware mixed-reality projection platforms can access it. Additionally, administrators can associate various digital media content with specified locations and objects in map 906. Map 906, digital media content instructions and digital media content can then be downloaded into any authorized flashlight-type of handheld spatially aware mixed-reality projection platform.

Figure 10:
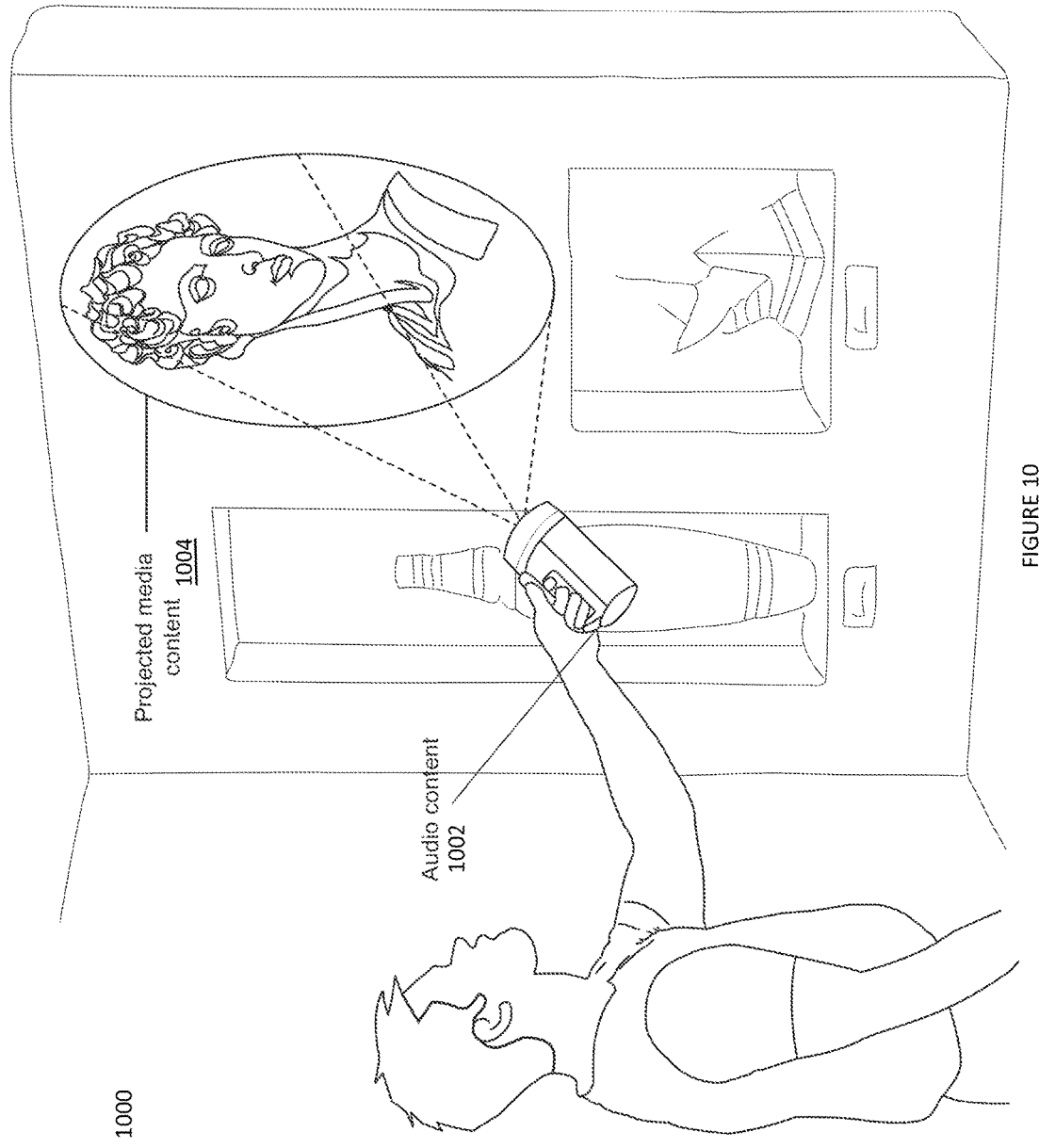
FIGS. 10 and 11 illustrate a pair of example depictions for projection of digital media content from the virtual environment onto the physical environment with a flashlight-type of handheld spatially aware mixed-reality projection platform, according to some embodiments.
Figure 11:
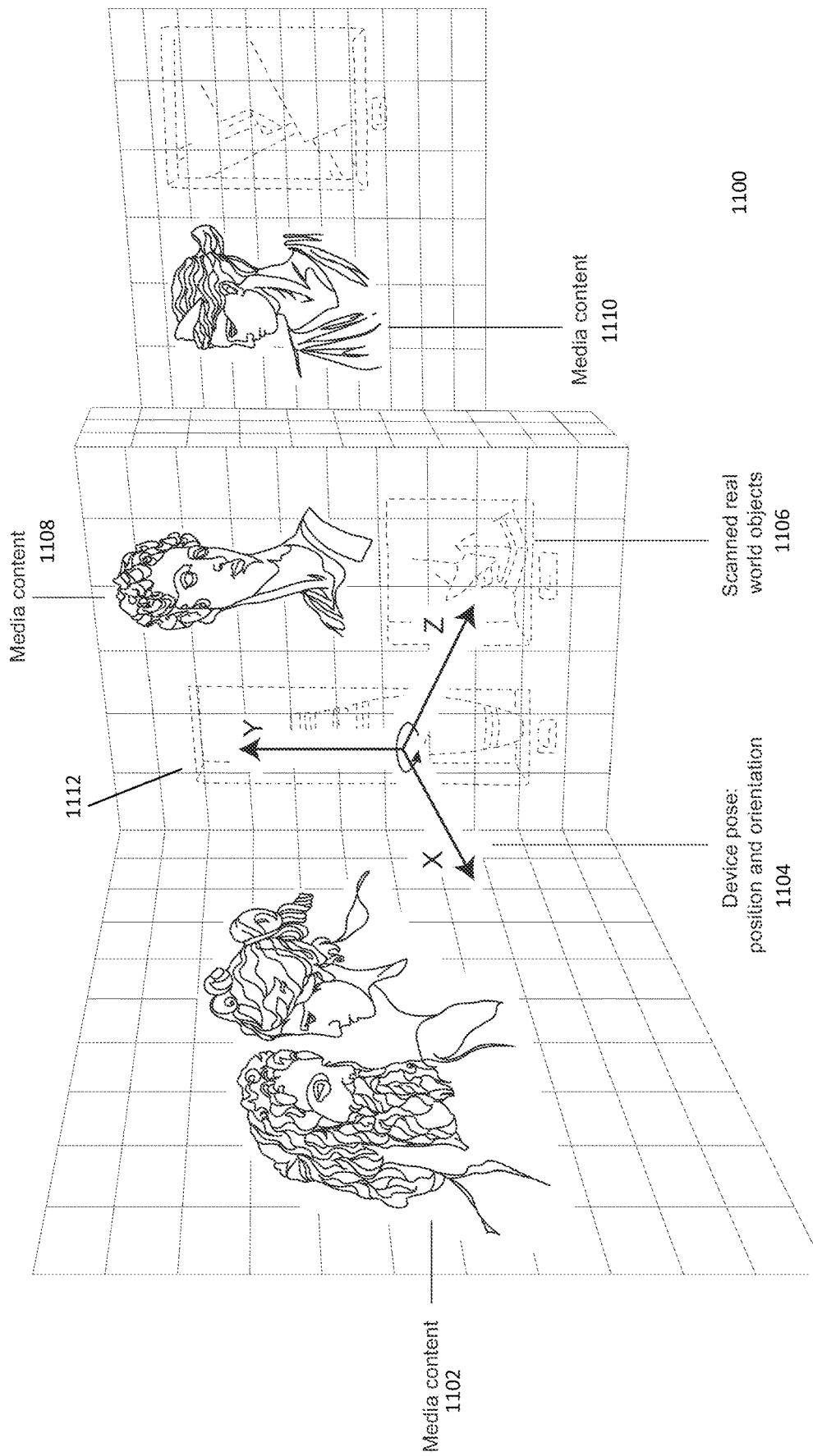
Figure 12:
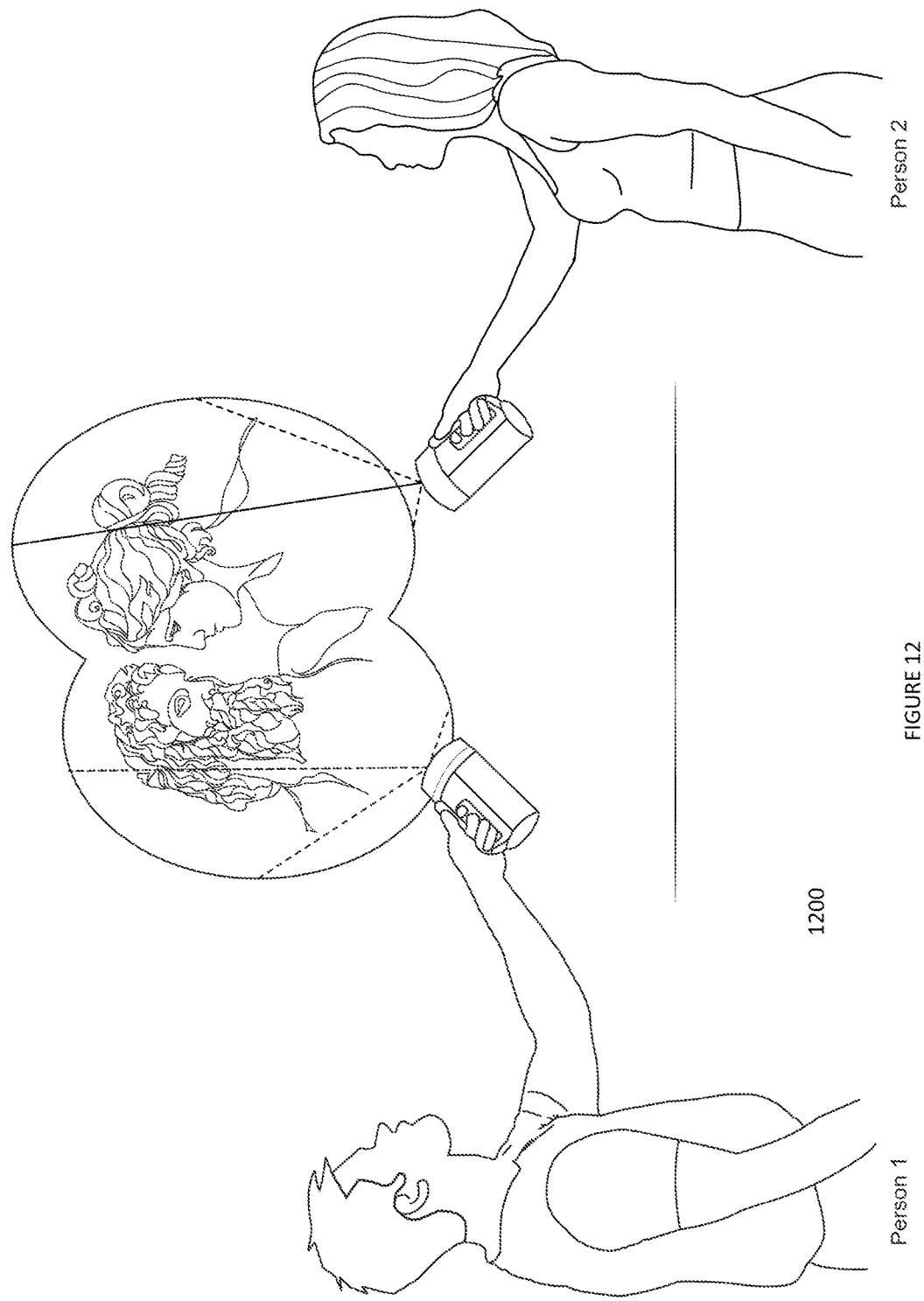
FIGS. 12-17 illustrate depictions for the use of handheld spatially aware mixed-reality projection platforms, according to some embodiments.
Figure 13:
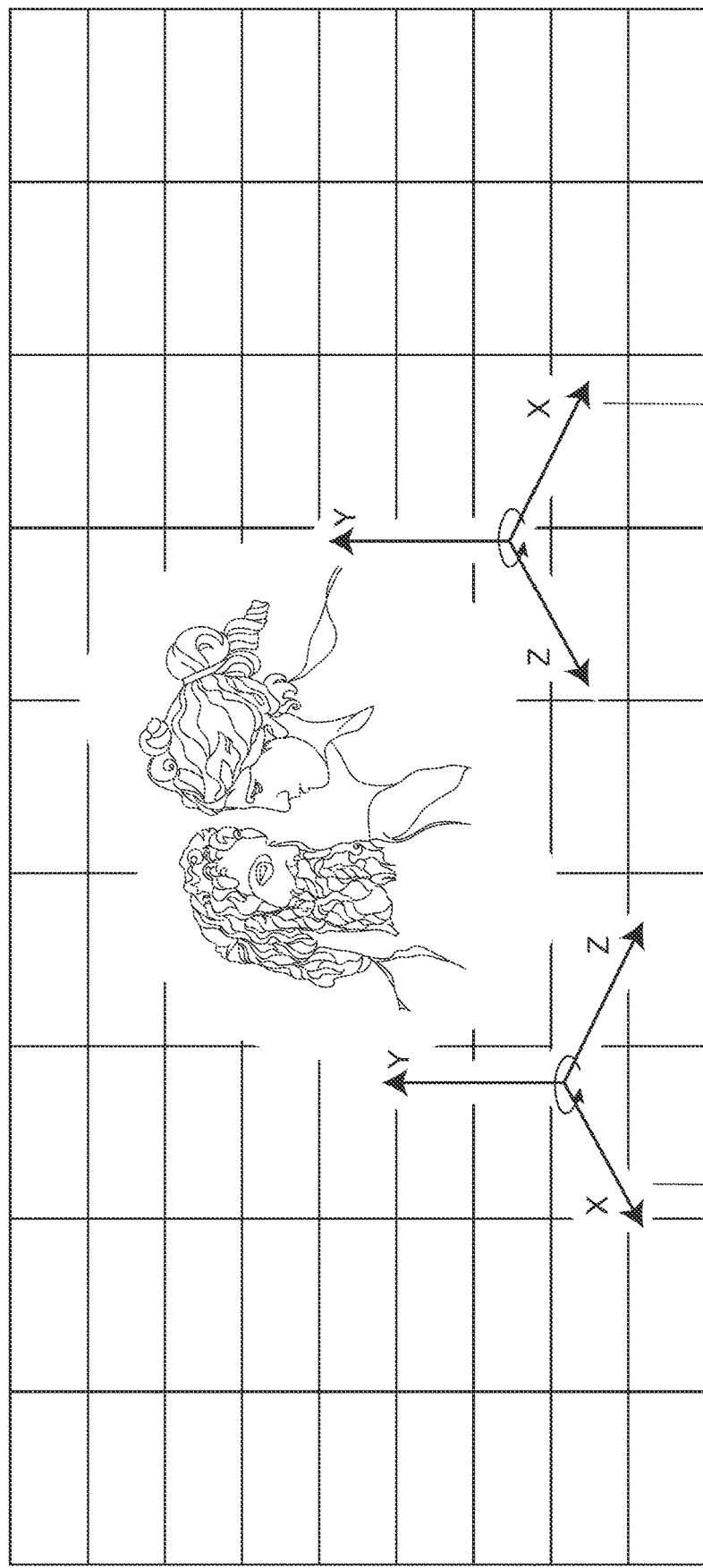
Figure 14:
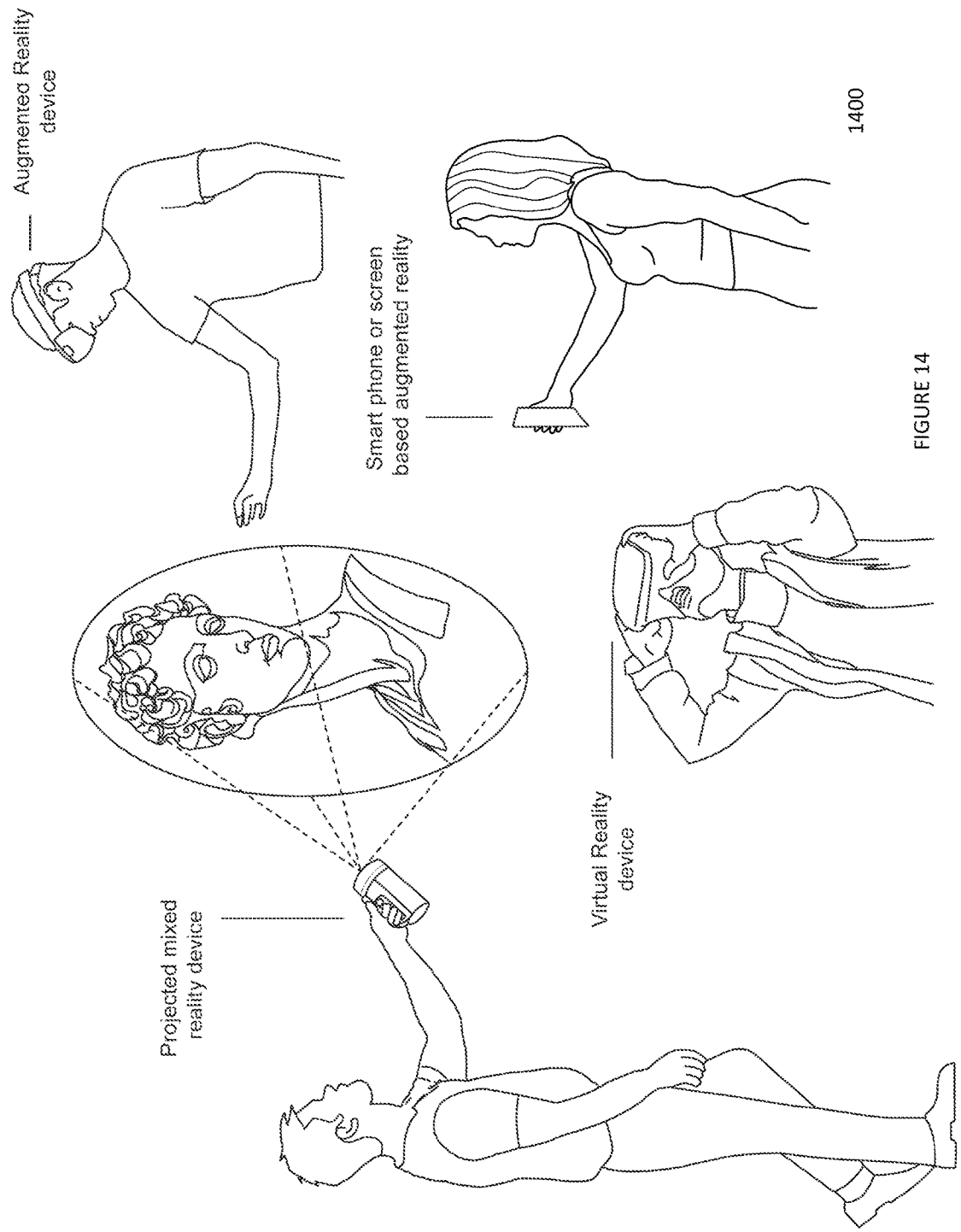
Figure 15:
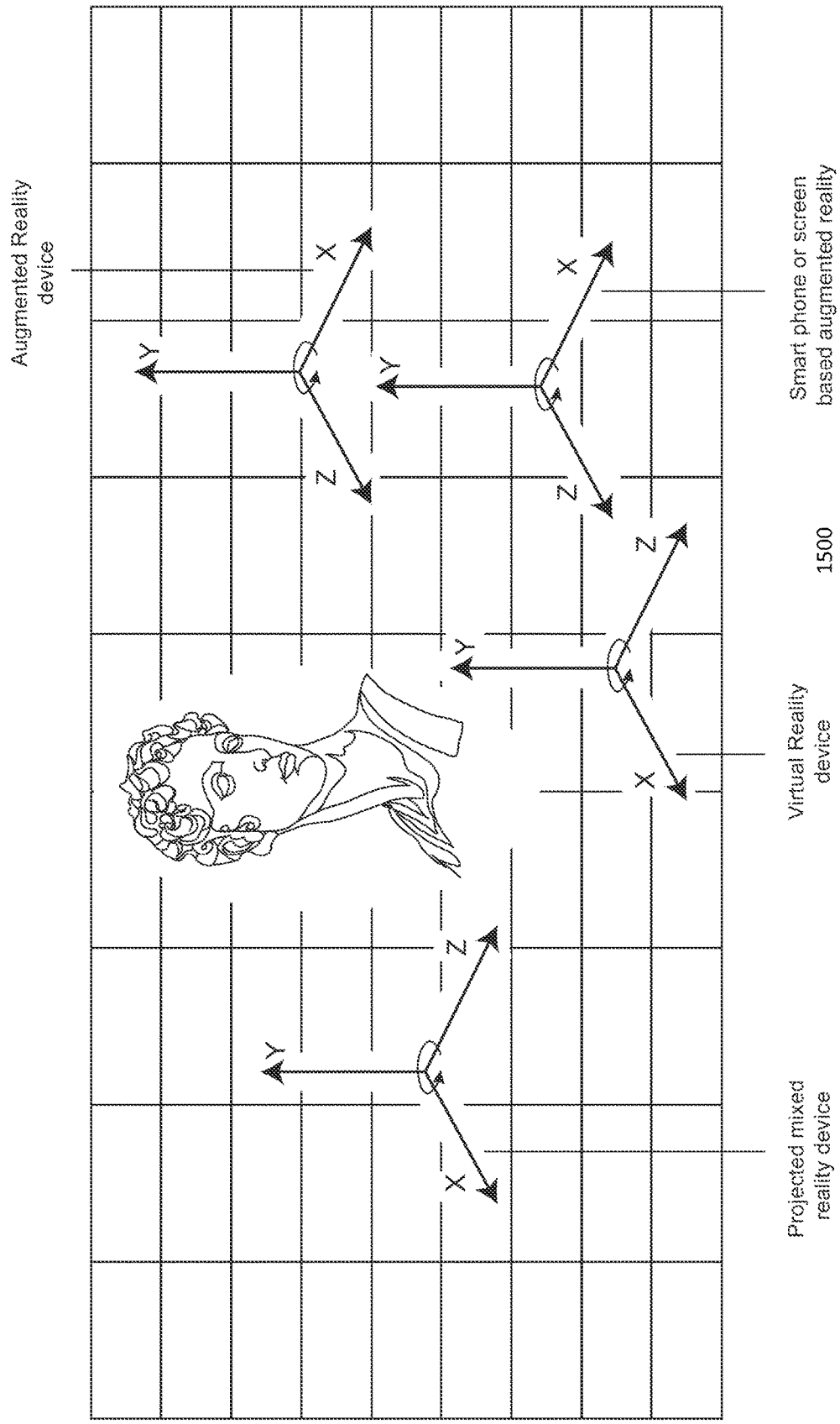
Figure 16:
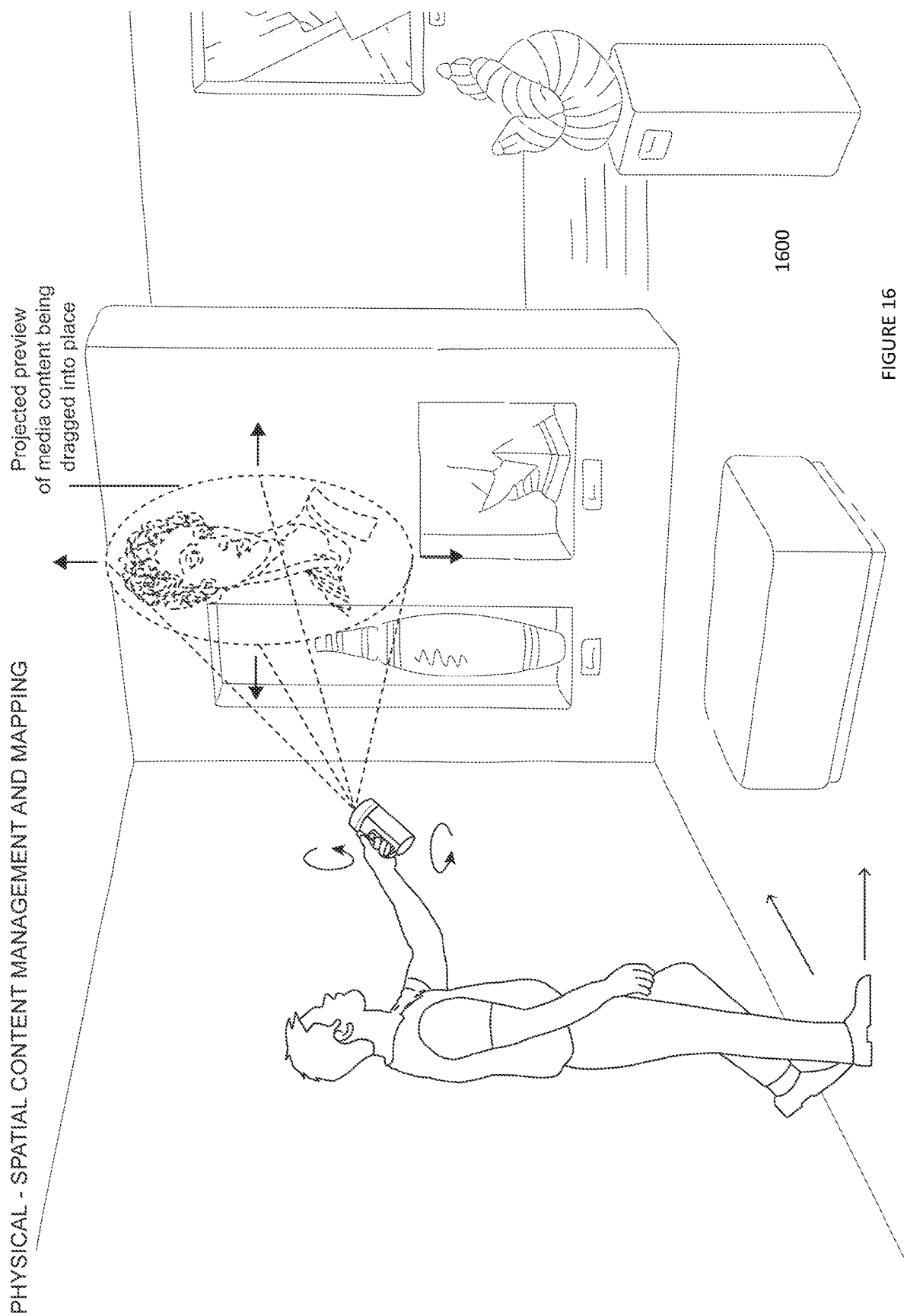
Figure 17:
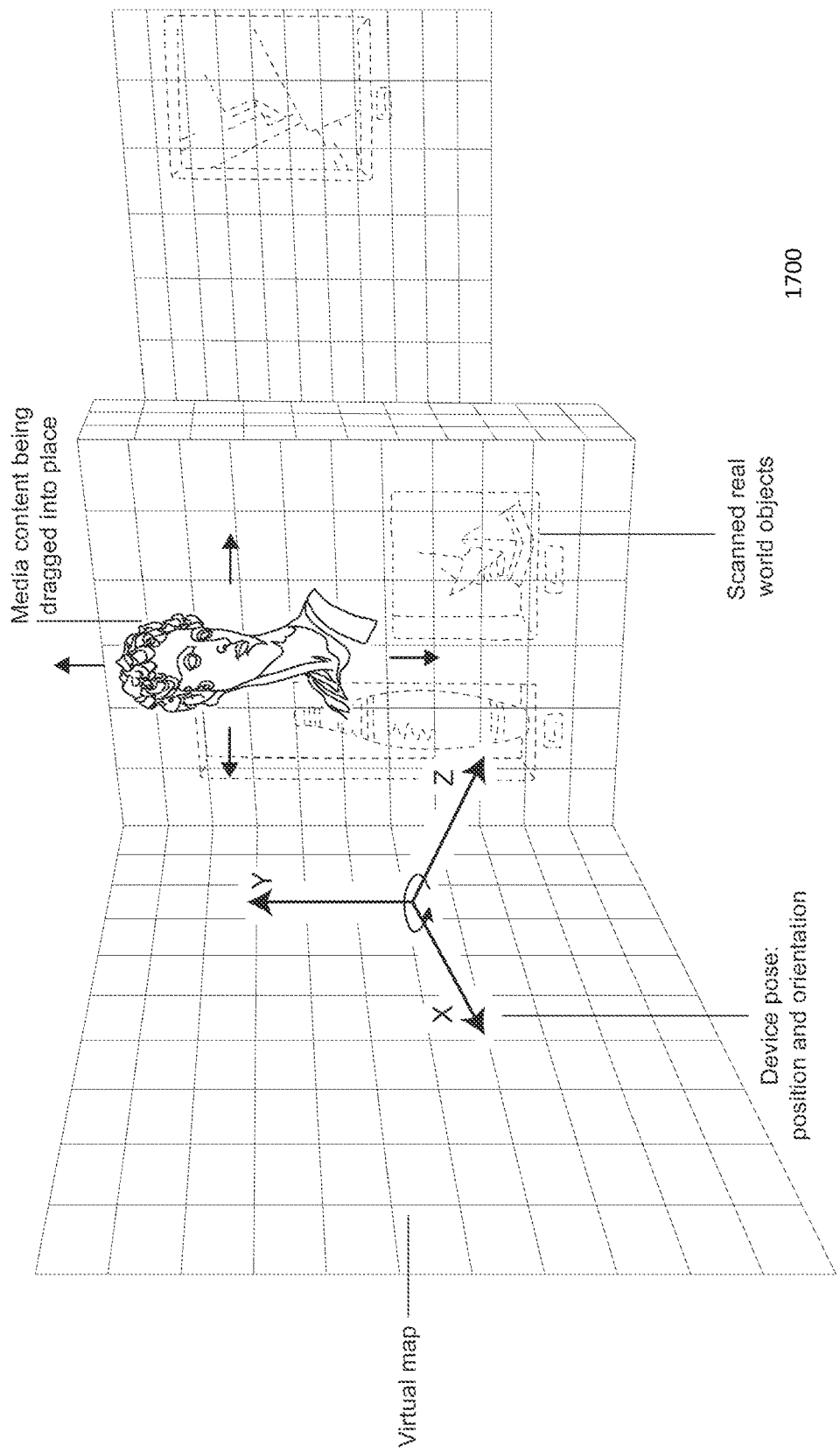

FIGS. 10 and 11 illustrate a pair of example depictions for projection of digital media content from the virtual environment onto the physical environment with a handheld spatially aware mixed-reality projection platform, according to some embodiments. Once the user starts a flashlight-type of handheld spatially aware mixed-reality projection platform, it uses SLAM and other systems to determine its location and orientation in the space of map 906. This location and orientation can be depicted in virtual world coordinates and orientation in map 906. This pose information (e.g., coordinates and orientation) can be shared with a game engine application 116 in the flashlight-type of handheld spatially aware mixed-reality projection platform.

As noted, game engine application 116 can manage the projection and interaction with digital media content mapped on the spatial surface or real-world object/objects the user is pointing the flashlight type of handheld spatially aware mixed-reality projection device at. Depending on the coordinates and orientation of the device in the physical environment, the device can reveal the virtual content on the physical surfaces via projection. This behavior is akin to a flashlight that can reveal objects in the dark when it points at them. In this way, digital media content can be overlaid onto the physical world. This projected digital media content can also scale seamlessly to make it feel as if the content is locked spatially in that location, for example a projected painting on the wall. The device utilizes the spatial information and depth information to simulate this behavior.

Users can make gestural inputs as input into the flashlight-type of handheld spatially aware mixed-reality projection platform. Game engine application 116 can interpret these gestural inputs as various commands. For example, game engine application 116 can update the content of the digital media content based on user gestures. In this way, the digital media content can be interactive.

Depiction 1000 shows a view of spatial projection of digital media content in the physical environment. The digital media content can include audio content 1002 played by one or more speakers (e.g., directional speakers focused on location of user, inbuilt speakers, etc.) in the flashlight-type of handheld spatially aware mixed-reality projection platform. The digital media content can include a digital image, digital video or an interactive digital experience projected by a laser projector in the flashlight-type of handheld spatially aware mixed-reality projection platform. The digital media content can be determined by the spatial location and/or orientation of the flashlight-type of handheld spatially aware mixed-reality projection platform in map 906.

Depiction 1100 shows a virtual mapping of the digital media content 1102, 1108 and 1110 in the virtual environment. The device location and orientation 1104 in the virtual mapping (e.g., map 906, etc.) is represented by the 3D axis. Real world objects 1106 in the physical environment corresponding to the virtual mapping are provided in broken lines. Haptic signals and audio signals can be used to guide the user to a location in the physical environment that corresponds to a location in the virtual environment to which digital media content was previously assigned.

FIGS. 12-17 illustrate depictions 1200-1500 for the use of handheld spatially aware mixed-reality projection platforms, according to some embodiments. Depiction 1200 represents the possibility of two or more handheld spatially aware mixed-reality projection devices being able to exist in the same virtual world. They can together reveal parts of the same digital media content via projections on the physical space and create a shareable experience for the users. They can be part of the same storytelling experience and can simulate a multiplayer gaming or viewing experience. Depiction 1300 shows the virtual representation of the physical event in depiction 1200.

Depiction 1400 shows the mixed-reality projection device being able to create a shared experience with other AR/VR systems including: augmented reality headsets, virtual reality headsets, smartphone or screen based augmented reality, etc. All the platforms exist in the same virtual environment created by the game engine application and allows users to have a shared social experience irrespective of the platform they are using. Depiction 1500 shows the virtual representation of all the platforms in the virtual environment together. It is also noted that in some embodiments, the functionalities and methods of a handheld spatially aware mixed-reality projection platform provided herein can be implemented in various mobile devices, smartphones, tablets, wearable devices, pedestal mounted, and other various devices with embedded projectors, etc.

Depictions 1600 and 1700 illustrate assigning media content onto the physical environment, according to some embodiments. Depiction 1600 shows physical-content placing and spatial mapping of digital media content. As shown, a projected view of the digital media content can be dragged into place. Depiction 1700 shows a virtual environment view of the mapping that results from placing and spatial mapping of digital media content that is performed in depiction 1600.

In one example, a LARP (Live Action Role Playing) story master creates immersive stories that utilize mixed-reality systems. The immersive mixed-reality stories can include interactions, different concepts such as storytelling with kids, storytelling in art galleries, storytelling in homes, etc. In this way, mixed-reality systems can be used as storytelling platforms that provide 'magical' interactions with a user's environment.

In another example, the mixed-reality system can be used to visualize various Internet of things (IoT) data. IoT control dashboards can be projected and the user can interact/manage the IoT systems.

Another example of a use of a handheld spatially aware mixed-reality projection platform/system in industries or factories can be to help augment the productivity of workers. For example, a handheld spatially aware mixed-reality projection platform can be used in mining industries to project relevant data on the real world. The handheld spatially aware mixed-reality projection platform can also be used in automobile industries to troubleshoot problems in a car by opening the hood and projecting relevant data like oil levels or engine temperature directly on the respective components in the car.

Figure 18:
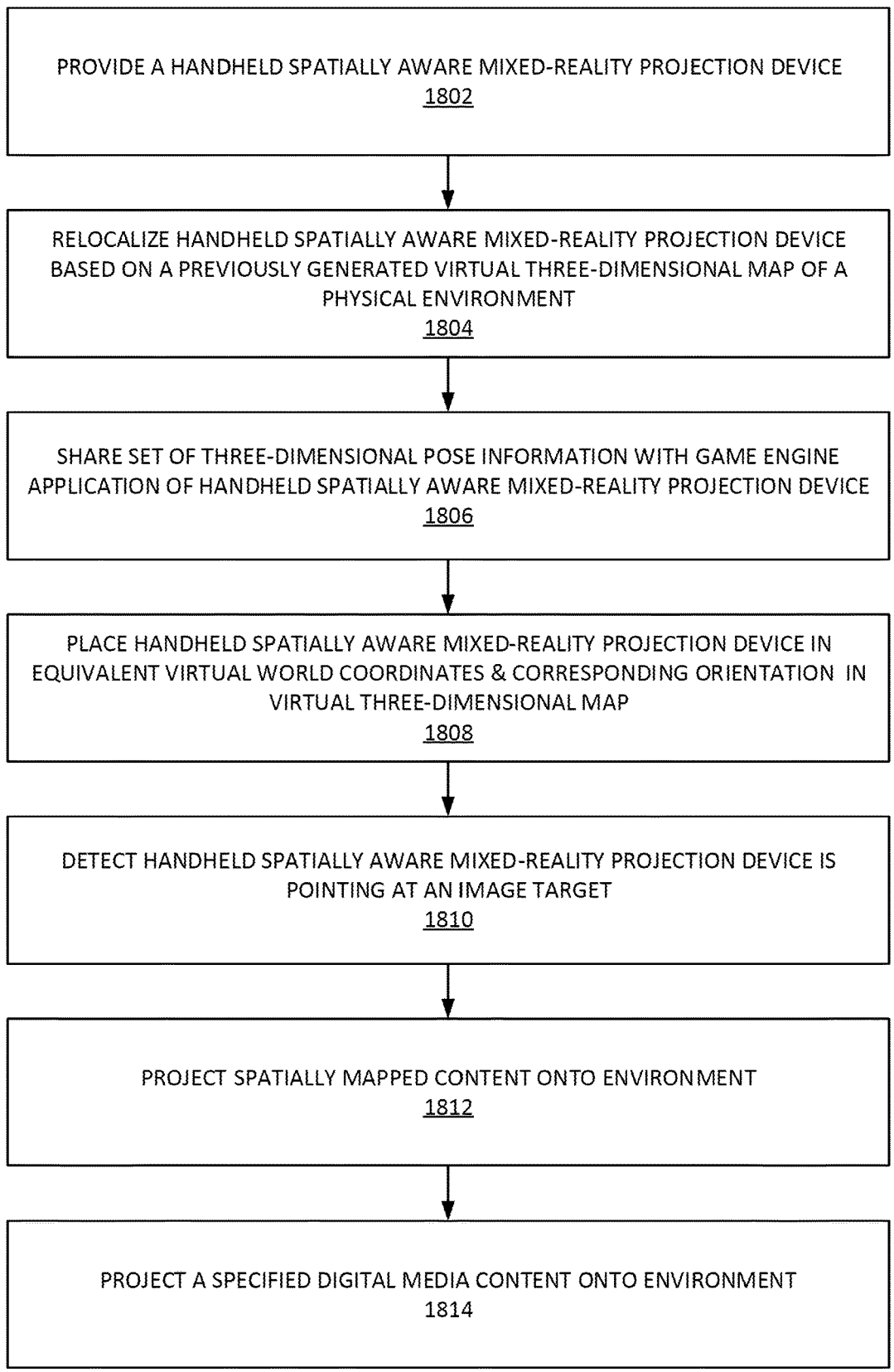
FIG. 18 illustrates an example process for augmenting a physical space with projected media content using a handheld spatially aware mixed reality projection platform, according to some embodiments.

FIG. 18 illustrates an example process for augmenting a physical space with projected media content using a handheld spatially aware mixed reality platform, according to some embodiments. In step 1802, process 1800 provides a handheld spatially aware mixed-reality projection device. In step 1804, with a mapping application in the handheld spatially aware mixed-reality projection device, process 1800 relocalizes the handheld spatially aware mixed-reality projection device based on a previously generated virtual three-dimensional map of a physical environment. This can include surroundings/environment/space. The virtual three-dimensional map includes a set of image targets corresponding to a specified physical location or physical object in the space. The relocalizing generates pose information of the handheld spatially aware mixed-reality projection device in the physical environment with respect to the virtual three-dimensional map. In step 1806, process 1800 shares the set of three-dimensional pose information with a game engine application of the handheld spatially aware mixed-reality projection device.

In step 1808, with the game engine application, process 1800 places the handheld spatially aware mixed-reality projection device in a set of equivalent virtual world coordinates and corresponding orientation of the device in the virtual three-dimensional map of the space.

It is noted that spatial awareness and accurate mapping of the virtual environment onto the physical environment can happen in two ways. Process 1800 can use the VSLAM method to relocalize the device using pose information to place the device in corresponding physical and virtual coordinates and orientation to determine the area of the physical environment it's pointing towards and display the corresponding area of the virtual environment in the projection field. Process 1800 can use image target recognition method to recognize an area (e.g., object, structure, painting, etc.) of the physical environment and project specified digital media content spatially mapped onto that area of the physical environment. Process 1800 can use a combination of the VSLAM method and the image target recognition method for more accurate relocalization and more accurate spatial mapping of the projected virtual environment onto the physical environment. Both methods and their combination can be used to generate the virtual environment on the spot or to relocalize it in a previously generated virtual environment. In the case that a virtual three-dimensional map of the physical environment has been previously generated, the handheld mixed-reality projection device can, in real-time (e.g., assuming processing and networking latencies), identify changes in topography, determine if physical structures have moved to other locations and update the virtual three-dimensional map accordingly.

In step 1810, process 1800 detects that handheld spatially aware mixed-reality projection device is pointing at an image target. In step 1812, depending on the coordinates and orientation of the device, process 1800 projects spatially mapped content onto the environment. In step 1814, with a laser projector of the handheld spatially aware mixed-reality projection device, process 1800 projects a specified digital media content onto the environment.

This spatially aware mixed-reality projection device can create digital affordances for physical appliances (e.g., lights, music players, televisions, etc.) by projecting control interfaces on top of them and is able to control them. The spatially aware mixed-reality projection device can assist in wayfinding by projecting navigational cues on the real world. The spatially aware mixed-reality projection device can receive diagnostic information and project contextual information on top of physical objects/appliances. The spatially aware mixed-reality device can project contextually relevant information like in coal mines to augment the work experience for a worker and increase their productivity.

In another example embodiment, for the multiplayer experience, two or more devices can be used within the same physical environment in a multiplayer experience, all revealing different parts of the same virtual environment in their projection fields. The virtual environment (e.g., the virtual three-dimensional map including digital media content) can be shared between multiple handheld spatially aware mixed-reality devices locally and/or online, and all devices in the multiplayer experience would be relocalized based on this shared map. They can all exist in the same instance of the virtual environment-if one device has activated digital media content in its projection field, another device projecting into the same area would see the same digital media content in action in real-time. Other types of augmented, virtual, mixed reality, or screen-based devices with AR capabilities can co-exist in the same multi-player experience with the handheld spatially aware mixed-reality device, all tapped into the same instance of the virtual environment real-time.

The handheld spatially aware mixed-reality projection device can have three modes it can be operated in: experience mode, map generation mode, and content management mode.

In experience mode, the device can be moved around and can be used to project onto any physical surface in the physical environment. The physical surface that is projected on can be the surface of a wall, floor, or ceiling, as well as the surface of an object in the physical environment. When the device projects onto a physical surface, the projection field displays a virtual environment that is mapped onto the physical environment. The projection field reveals the virtual environment akin to a flashlight revealing things in the dark.

When the device is projecting onto an area of the physical environment, the projection field can display the area of the virtual environment that corresponds to the area of the physical environment that falls within the projection field. A mapping application can relocalize the device in the physical environment and communicate its three-dimensional coordinates and orientation to a game engine application. The game engine application can place the device in equivalent three-dimensional coordinates and orientation in the virtual environment. The projection field can be moved around to display different areas and surfaces of the virtual environment spatially mapped onto the physical environment that falls within the projection field. The larger or smaller areas of the virtual environment can be revealed by changing the size of the projection field. The size of the projection field can be changed by moving the device closer or further away from the physical surface it is projecting on.

The virtual environment can be a three-dimensional map of the physical environment (e.g., a 3D model that corresponds to the surfaces of walls, floors, ceilings, and objects in the physical environment). It can be stored in a game engine application. The virtual environment can be the virtual three-dimensional map of a physical environment that is augmented with digital media content. Digital media content can be digital images, text, video, interactive media, 3D graphics, 3D models, 2D and 3D animation, graphical user interfaces, etc. Digital media content can be activated and/or interacted with when they appear in the projection field or when the device is in specified coordinates. When activated, digital media content can trigger and be accompanied by audio and haptics. Digital media content can be interacted with using voice recognition, gesture recognition, and button controls on the device.

The virtual environment can be generated earlier in time or in real-time. For an experience where a pre-generated virtual environment is needed, the device itself can be used in map generation mode to create and store a virtual three-dimensional map by moving around and scanning the physical environment. For experiences where a pre-generated map is not needed, the device can map the physical environment instantaneously while in experience mode.

Digital media content can be placed onto the virtual three-dimensional map to create the virtual environment. This can be done automatically and/or manually. To place and/or edit digital media content onto an already generated virtual three-dimensional map, a projected interface can be used in situ in the physical environment when the device is in content management mode. It can also be done through the game engine application on a screen-based interface on another device.

Figure 19:
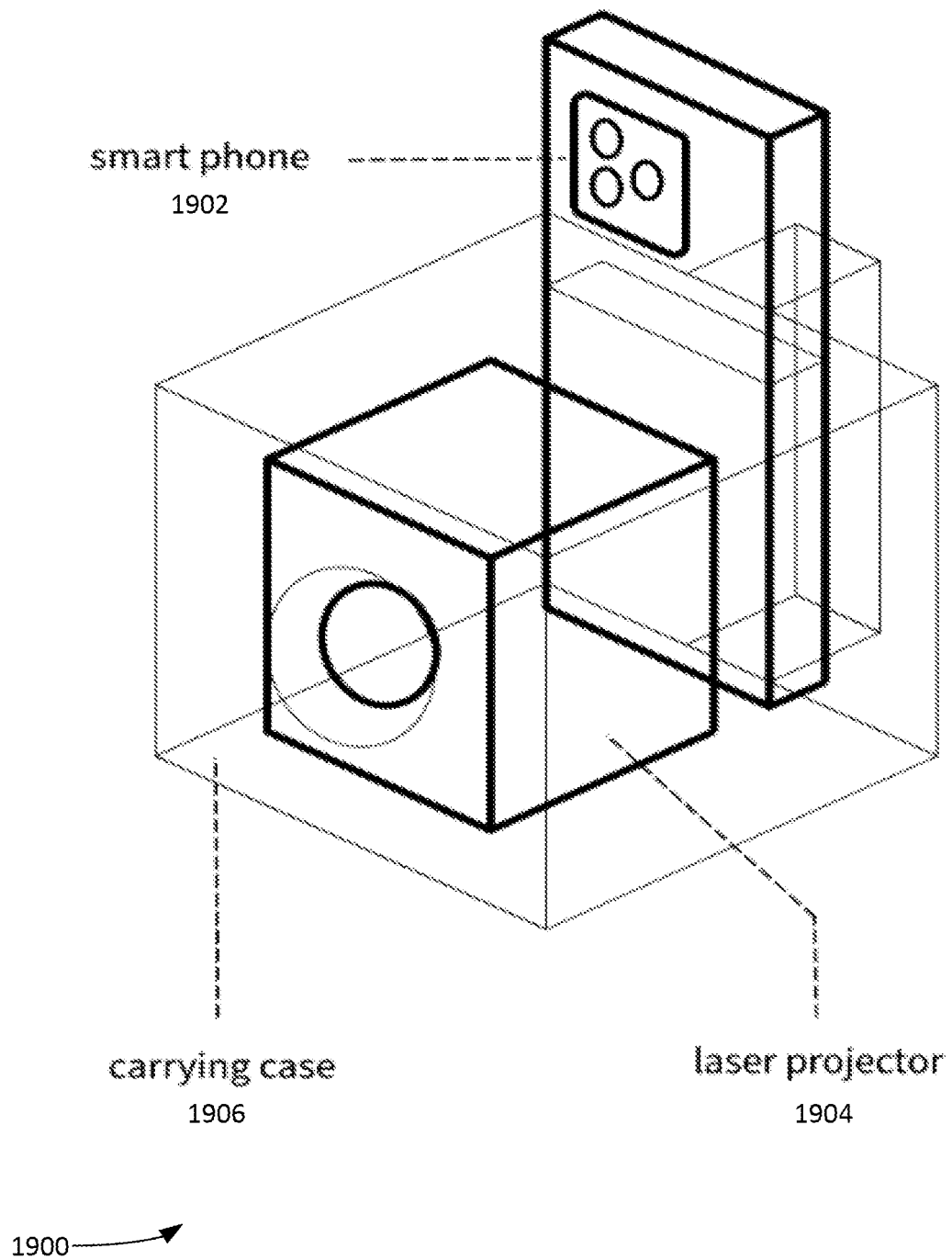
FIG. 19 illustrates an example of a spatially aware mixed reality projection platform as a smartphone with an accompanying case, according to some embodiments.

FIG. 19 illustrates an example of a spatially aware mixed reality projection platform as a smartphone with an accompanying case system 1900, according to some embodiments.

In one embodiment, the spatially aware mixed reality projection platform can be a smartphone 1902 with an accompanying case 1906. In this example, the spatially aware mixed reality projection platform can utilize the smartphone's cameras, LIDAR sensor, inertia sensors, etc. to become spatially aware. As shown, the smartphone case is composed of a built-in laser projector 1904. The smartphone case can be fitted to various compatible smartphones. This combination can mimic the same experience as the handheld spatially aware mixed reality projection device. It is noted that the smartphone with an accompanying case system 1900 can include modified versions of systems 100 and 200 of FIG. 1 and FIG. 2 provided supra.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A method for augmenting a physical environment with projected media content from a virtual environment, using a handheld spatially aware mixed reality projection platform, comprising the steps of:

providing a handheld spatially aware mixed-reality projection device;

with a mapping application in the handheld spatially aware mixed-reality projection device, relocalizing the handheld spatially aware mixed-reality projection device based on a virtual three-dimensional map of a physical environment, wherein the relocalizing generates pose information of the handheld spatially aware mixed-reality projection device in the physical environment with respect to the virtual three-dimensional map;

sharing the set of three-dimensional pose information with a game engine application of the handheld spatially aware mixed-reality projection device;

with the game engine application, placing the handheld spatially aware mixed-reality projection device in a set of equivalent virtual world coordinates and corresponding orientation in the virtual three-dimensional map of a space;

wherein the virtual three-dimensional map of the space is augmented with digital media content to create a virtual environment, detecting that the handheld spatially aware mixed-reality projection device is pointing at a physical structure that corresponds to an image target; and using a laser projector in the handheld spatially aware mixed-reality projection device, the handheld spatially aware mixed-reality projection device creates a projection field, wherein the spatially mapped digital media content is revealed from the virtual environment overlaid onto the physical environment.

2. The method of claim 1, wherein the projected digital media content displayed in the projection field comprises an interactive experience that includes spatially mapped visual digital media content.

3. The method of 2, wherein the spatially aware mixed reality projection platform comprises a smartphone with an accompanying smartphone case, and wherein the smartphone case comprises a built-in laser projector, and wherein the smartphone and the smartphone case combination mimics a same experience as the handheld spatially aware mixed reality projection device.

4. The method of claim 1, wherein the handheld spatially aware mixed-reality device activates spatially mapped digital media content when it is displayed within the projection field.

5. The method of claim 1, wherein the virtual three-dimensional map of an environment is generated by:
the handheld spatially aware mixed-reality device that uses a visual simultaneous localization and mapping (VSLAM) tracking camera to:
capture a point cloud depth representation of the space; and
capture the coordinates and orientation of device data of the handheld spatially aware mixed-reality projection device in the physical environment as a user moves around a space holding the VSLAM tracking camera.

6. The method of claim 5, further comprising:
using the point cloud depth representation of the space and the tracking data of the handheld spatially aware mixed-reality projection device to generate the virtual three-dimensional map of the physical environment.

7. The method of claim 6, wherein an image target corresponding to a surface of a physical structure in the physical environment is detected and tracked by a recognition system of the handheld spatially aware mixed-reality projection device while the user is pointing the handheld spatially aware mixed-reality projection device at the physical structure.

8. The method of claim 7, wherein the image recognition system detects and tracks an image by comparing extracted natural features of the specified physical structure as obtained from a digital camera image against a known target resource database stored in the handheld spatially aware mixed-reality projection device.

9. The method of claim 8, wherein the handheld spatially aware mixed-reality projection device uses a VSLAM method for mapping, relocalization, and spatial awareness of the physical environment, and wherein this is combined with the image target recognition system to reduce drift and increase accuracy of spatial mapping of the virtual environment onto the physical environment.

10. The method of claim 1, wherein the relocalizing of the device in the virtual three-dimensional map happens via a VSLAM method utilizing a VSLAM tracking camera and a depth camera, and wherein the VSLAM method shares the pose information of the device with the game engine application.

11. The method of claim 1, wherein the handheld mixed-reality projection device determines that a set of physical structures have moved to other locations in the physical environment and correspondingly updates a position of the set of physical structures in the virtual three-dimensional map.

12. The method of claim 1, wherein the handheld spatially aware mixed-reality projection device is configured to browse through and select digital media content in a projected content management interface, move and drag the projection of selected digital media content to a desired part of the physical environment, place and map selected digital media content onto the physical structure that is being projected onto, and update the virtual environment.

13. The method of claim 1, wherein the handheld spatially aware mixed-reality projection device projects a content management interface through which it is configured to select, edit, move, delete spatially mapped digital media content that appears in the projection field, wherein the digital media content had been previously placed onto the virtual environment that corresponds to the physical environment that is being projected onto.

14. The method of claim 1, wherein the handheld spatially aware mixed-reality projection device comprises a laser projector, computer processor, a tracking and depth camera, LIDAR camera, a set of speakers and a haptic system.

15. The method of claim 1, wherein the handheld spatially aware mixed-reality projection device is configured to accept gesture input, physical input, and sound input of the user as a control mechanism.

16. A computerized system for augmenting a physical space with projected media content using a handheld spatially aware mixed reality projection device comprising:
a processor;
a memory containing instructions that when executed on the processor, causes the processor to perform operations that:
with a mapping application in the handheld spatially aware mixed-reality projection device, relocalize the handheld spatially aware mixed-reality projection device based on a virtual three-dimensional map of a physical environment, wherein the relocalizing generates pose information of the handheld spatially aware mixed-reality projection device in the physical environment with respect to the virtual three-dimensional map;
share the set of three-dimensional pose information with a game engine application of the handheld spatially aware mixed-reality projection device;
with the game engine application, placing the handheld spatially aware mixed-reality projection device in a set of equivalent virtual world coordinates and corresponding orientation of the handheld spatially aware mixed-reality projection device in the virtual three-dimensional map of the space;
wherein the virtual three-dimensional map of the physical space is augmented with digital media content to create a virtual environment;
detecting that the handheld spatially aware mixed-reality projection device is pointing at a physical structure that corresponds to an image target; and
using a laser projector in the handheld spatially aware mixed-reality projection device, wherein the handheld spatially aware mixed-reality projection device creates a projection field, wherein the spatially mapped digital media content is revealed from the virtual environment overlaid onto the physical environment.

17. The computerized system of claim 16, wherein the projected digital media content comprises an interactive experience that includes a spatially mapped visual media, and wherein the spatially mapped visual media comprises a video accompanied by a sound effect or a haptic effect.

18. The computerized system of 17, wherein the handheld spatially aware mixed-reality projection device guides the user to point the handheld spatially aware mixed-reality projection device at areas of interest in the physical environment via projected navigational cues accompanied by the sound effect or the haptic effect.

19. The computerized system of claim 18, wherein the spatially aware mixed reality projection platform comprises a smartphone with an accompanying smartphone case, and wherein the smartphone case comprises a built-in laser projector, and wherein the smartphone and the smartphone case combination mimics a same experience as the handheld spatially aware mixed reality projection device.

\* \* \* \* \*